US008125530B2

(12) United States Patent
Ooga et al.

(10) Patent No.: US 8,125,530 B2
(45) Date of Patent: Feb. 28, 2012

(54) INFORMATION RECORDING SYSTEM, INFORMATION RECORDING DEVICE, INFORMATION RECORDING METHOD, AND INFORMATION COLLECTING PROGRAM

(75) Inventors: Satoru Ooga, Tokyo (JP); Akihiko Iketani, Tokyo (JP)

(73) Assignee: NEC Corporation, Tokyo (JP)

( * ) Notice: Subject to any disclaimer, the term of this patent is extended or adjusted under 35 U.S.C. 154(b) by 774 days.

(21) Appl. No.: 12/087,669

(22) PCT Filed: Jan. 11, 2007

(86) PCT No.: PCT/JP2007/050239
§ 371 (c)(1), (2), (4) Date: Jul. 11, 2008

(87) PCT Pub. No.: WO2007/080921
PCT Pub. Date: Jul. 19, 2007

(65) Prior Publication Data

US 2009/0015684 A1 Jan. 15, 2009

(30) Foreign Application Priority Data

Jan. 13, 2006 (JP) ................................ 2006-006570

(51) Int. Cl.
*H04N 5/232* (2006.01)

(52) U.S. Cl. .................. 348/211.4; 348/211.2; 725/105

(58) Field of Classification Search .. 348/211.99–211.5, 348/211.14, 118, 119; 725/105, 106–134; 704/231; 370/429
See application file for complete search history.

(56) References Cited

U.S. PATENT DOCUMENTS 7,027,460 B2 * 4/2006 Iyer et al. ...................... 370/429
2007/0153091 A1 * 7/2007 Watlington et al. ...... 348/208.14

* cited by examiner

*Primary Examiner* — Tuan Ho
(74) *Attorney, Agent, or Firm* — McGinn IP Law Group, PLLC

(57) ABSTRACT

An accident judgment device (105) judges whether or not an accident has occurred based on a detection signal of an impact sensor (104). Upon judging that an accident has occurred, an image saving device (106) extracts an image within several seconds before and after occurrence of the accident from a ring buffer (103) to save the same in a save memory (107). Upon judging that the accident has occurred, an image-record requesting device (108) transmits an image-recording request to a drive recorder (10) of target vehicles existing in the vicinity of the accident spot. Upon receiving the image-recording request, an image saving device (106) of the drive recorder (10) on the target vehicle extracts the image within several seconds before and after occurrence of the accident from the ring buffer (103) to save the same into the save memory (107).

4 Claims, 17 Drawing Sheets

INFORMATION RECORDING SYSTEM, INFORMATION RECORDING DEVICE, INFORMATION RECORDING METHOD, AND INFORMATION COLLECTING PROGRAM

FIELD OF THE INVENTION

The present invention relates to an information recording system, an information recording device, and an information recording method that detect an abnormal state to record abnormal-status information that represents the status upon occurrence of the abnormal state. The present invention also relates to an information collecting server and an information collecting program that collect abnormal-status information from the information recording device.

BACKGROUND OF THE INVENTION

As a method for recording status information of abnormal state such as an accident and a crime, there is a technique that records an image upon occurrence of an accident by using a moving-image recording apparatus such as an on-vehicle camera. In such as case, upon occurrence of the accident or a sudden acceleration or sudden deceleration that is likely to lead an accident, a drive recorder, for example, is used to record an image or running data before and after the accident.

Patent Publication JP-2004-75023A, for example, describes a vehicle-information recorder that receives, upon detecting a counter vehicle that configures a single vehicle-to-vehicle network together with the own vehicle, running-state information including a forward image or a vehicle locus during the running from the thus detected counter vehicle, and records the same information. Patent Publication JP-2004-17901A, for example, describes an automated vehicle-accident-information collecting system that receives vehicle-status information attached with a video from a vehicle upon occurrence of an accident, to automatically formulate a vehicle-accident receipt list including the video. Patent Publication JP-2004-86780A, for example, describes an on-vehicle recording device that acquires, upon occurring of an accident, identification information for identifying neighboring vehicles running in the vicinity thereof via a vehicle-to-vehicle network.

However, if an image is to be recorded using the drive recorder upon occurrence of an accident, the camera image can be recorded only a specific time length. More specifically, the image can be recorded only for a few seconds before and after the occurrence of the accident. Therefore, the moving image that the drive recorder mounted on vehicles other than the accident vehicle has taken will be overwritten and erased after an elapse of time. Thus, detailed investigation of the accident status cannot be performed using the image of the drive recorder mounted on the vehicles that were running before, after or adjacent to the accident vehicle. That is, it is only possible to use the information (image) of the drive recorder mounted on the accident vehicle, which has stopped for the overwrite recording, for verification of the accident status.

In addition, in case of using the drive recorder, only the drive recorder mounted on the accident vehicle can store the moving image under shooting due to detecting the accident of the own vehicle. For this reason, if the drive recorder mounted on a vehicle other than the accident vehicle may record the accident or event occurring on the foreground, the image cannot be stored.

Further, in case of using the drive recorder for verification of the accident, it is only possible to use the moving image of the drive recorder mounted on the accident vehicle that has stopped the shooting due to occurrence of the accident. Thus, it is the most cases that the terminals storing therein the moving image include only the drive recorder mounted on at most one or two vehicles (that is involved with the accident) other than the own vehicle. In addition, since these terminals are left in the vehicle while storing the moving image, the perpetrator of the accident may destroy or lose intentionally the recording apparatus.

It may be considered that the driver recorder is configured to have a function of transmitting externally the image information thus recorded via a communication device. However, it is necessary for the transmission to use a portable telephone module etc. mounted on a portable telephone, thereby raising the cost for transmission. Accordingly, there is a possibility that a user of a vehicle other than the accident vehicle may hesitate offering of the information due to the communication cost burdened on himself.

The vehicle information recorder described in JP-2004-75023A, if used here, may record the running status information acquired by a vehicle other than the own vehicle. However, it is not sure whether the status of accident can be verified by collecting the information acquired by a vehicle that was running in the vicinity of the accident spot, in addition to the accident vehicle, upon occurrence of the accident.

The automated vehicle-accident-status collection system described in JP-2004-17901A, if it is used here, may collect information attached with a video image taken by the accident vehicle. However, it is only possible to collect the image taken by the accident vehicle, and it is impossible to collect the information acquired by a vehicle that was running in the vicinity of the accident spot.

The on-vehicle recorder described in JP-2004-86780A, if it is used here, may identify the vehicles that were running in the vicinity of the accident spot. However, it is only possible to identify the vehicles that were running in the vicinity of the accident spot, and it is impossible to collect the image upon occurrence of the accident from the vehicles that were running in the vicinity of the accident spot.

SUMMARY OF THE INVENTION

In view of the above, it is an object of the present invention to provide information recording system, information recording device, information collecting server, information recording method, and information collecting program, which can record, in addition to the status information acquired at the spot where an abnormal state has occurred, the information acquired in the vicinity of the spot where the abnormal state has occurred.

The present invention provides an information recording system for recording abnormal-status information (for example, image of a vehicle upon occurrence of an accident) that represents a status upon occurrence of an abnormal state, including a plurality of information recording devices (for example, drive recorders 10), the information recording devices each including: a ring buffer (for example, realized by ring buffer 103) that repeatedly records status information (for example, image, sound or running data) that represents a status of a vicinity of a corresponding one of the information recording devices; a save memory (for example, realized by save memory 107) storing therein information separately from the ring buffer; a save requesting device (for example, realized by image-record requesting device 108) that transmits save-request information (for example, image-recording request) that requests the information recording devices other than the corresponding one of the information recording devices to save the status information stored in the ring buffer; an information saving device (for example, realized by image saving device 106) that extracts, upon receiving save-request information from the information recording devices other than the corresponding one of the information recording devices, the status information from the ring buffer to store the extracted status information in the save memory as abnormal-status information.

The configuration in the information recording system may be such that: the information recording devices each comprise an abnormality detection device (for example, realized by accident judgment device 105) that detects occurring of the abnormal state; and the save requesting device transmits, upon detection of the abnormal state by the abnormality detection device, save-request information to the information recording devices.

The configuration in the information recording system may be such that: the information recording devices each include: an offer requesting device (for example, realized by offer requesting device 108) that transmits offer-request information requesting offer of information to the information recording devices other than the corresponding one of the information recording devices; an offered-information extraction device (for example, realized by image-data offering device 112) that extracts, upon receiving offer-request information from the information recording devices other than the corresponding one of the information recording devices, abnormal-status information from the save memory; and an offered-information transmission device (for example, realized by communication device 109) that transmits the abnormal-status information extracted by the offered-information extraction device to the information recording devices from which the offer-request information is received.

The configuration in the information recording system may be such that: the information recording devices each include an abnormality-specifying-ID creating device (for example, realized by image-record requesting device 108) that creates an abnormality-specifying ID specifying the abnormal state; the save requesting device transmits save-request information including the abnormality-specifying ID to the information recording devices other than the corresponding one of the information recording devices; the information saving device (106) stores in the save memory the abnormal-status information in association with the abnormality-specifying ID included in the saver request information received from the information recording devices other than the corresponding one of the information recording devices; the offer requesting device (108) transmits save-request information including the abnormality-specifying ID to the information recording devices other than the corresponding one of the information recording devices; the information extraction device extracts abnormal-status information corresponding to the abnormality-specifying ID included in the offer request information received from the information recording devices other than the corresponding one of the information recording devices.

The configuration in the information recording system may further include an information collecting server (for example, realized by accident-information collecting server 20), and may be such that: the information recording devices (10) each include: an offered-information extraction device (for example, image-data offering device 112) that extracts, upon receiving offer-request information (for example, image collection request) requesting offer of information from the information collecting server, the abnormal-status information from the save memory (107); and an offered-information transmission device (for example, communication device 109) that transmits the abnormal-status information extracted by the offered-information extraction device to the information collecting server via a communication network; and the information collecting server includes: an information accumulation device (for example, realized by image database 204) that accumulates information; an on-server offer requesting device (for example, realized by image-offer-request transmission device 202) that transmits, upon receiving collection request information (for example, image-offering request) requesting collection of information from the information recording devices, offer request information to the information recording devices via the communication network; and an information registry device (for example, realized by offered-image receiving device 203) that allows the information accumulation device to store therein the abnormal-status information received from the information recording devices.

The configuration in the information recording system may be such that: the information recording devices each includes an abnormality-specifying-ID creating device (for example, realized by image-record requesting device 108) that creates abnormality-specifying ID specifying the abnormal state; the save requesting device (108) transmits, to the information recording devices other than the corresponding one of the information recording devices, save request information including the abnormality-specifying ID (for example, accident session ID) created by the abnormality-specifying-ID creating device; the information saving device stores in the save memory the abnormal-status information in association with the abnormality-specifying ID included in the save request information received from the information recording devices other than the corresponding one of the information recording devices; the on-server offer requesting device transmits offer request information including the abnormality-specifying ID to the information recording devices; and the offered-information extraction device extracts from the save memory abnormal-status information corresponding to the abnormality-specifying ID included in the offer request information received from the information collecting server.

The configuration in the information recording system may be such that: the information recording devices each include an offer-permission/refusal judging device (for example, realized by offer permission device 116) that judges, upon receiving the offer request information from the information collecting server, whether or not the offer of information is permitted; and the offered-information extraction device extracts the abnormal-status information from the save memory, if the offer-permission/refusal judging device judges that the offer of information is permitted.

The configuration in the information recording system may be such that: the information recording devices (10) each include an anonymizing device (for example, realized by anonymizing device 115) that anonymizes a user name; the offered-information transmission device (109) transmits, to the information collecting server via the communication network, the abnormal-status information extracted by the offered-information extraction device in a state anonymized by the anonymizing device.

The configuration in the information recording system may be such that the information collecting server includes: a refundable-amount calculation device (for example, realized by incentive information calculating device 207) that creates refundable-amount information (for example, incentive information) specifying refundable-amount for a communication fee to a user of the information recording devices (10) who offered the abnormal-status information; a refundable-amount-information transmission device (208) that transmits refundable-amount information created by the a refundable-amount calculation device via the communication network to the information recording devices that offered the abnormal-status information.

The information recording system may include a relay station (for example, realized by relay station 30) that relays communication between the information recording devices, and may be such that: the information recording devices each include an abnormality-position creating device (for example, realized by position-information calculating device 117) that creates abnormality-position information specifying an incident spot of the abnormal state, and an abnormality-position judgment device (for example, realized by image saving device 106C) that judges whether or not the corresponding one of the information recording devices exists within a specified distance from the incident spot of the abnormal state based on the abnormality-position information received from the relay station; the save requesting device transmits to the relay station the abnormality-position information created by the abnormality-position creating device together with the save request information; the relay station includes a save request transfer device (for example, realized by a control section and a communication section of relation station 30) that transmits the save request information and abnormality-position information that are received from any of the information recording devices to the information recording devices; the information saving device extracts, upon judging that the corresponding one of the information recording devices exists within the specified distance from the incident spot of the abnormal state, the status information from the ring buffer, to store the extracted information in the save memory as the abnormal-status information.

The configuration in the information recording system may be such that: the information recording devices are each mounted on a vehicle (for example, car, motorcycle or train; the ring buffer repeatedly stores therein images of a vicinity of the vehicle as the status information; the save requesting device transmits, upon detecting an accident of a corresponding vehicle, the save request information to the information recording devices mounted on other vehicles; the information saving device extracts, upon receiving the save request information from one of the information recording devices mounted on another vehicle, an image from the ring buffer to store the extracted image in the save memory as the image upon occurrence of the accident.

The present invention provides an information recording device for recording abnormal-status information representing a status upon occurrence of an abnormal state, including: a ring buffer that repeatedly stores therein status information representing a status of a vicinity of the information recording device; a save memory that saves information separately from the ring buffer; a save requesting device that transmits save request information that requests the information recording devices other than the information recording device to save the status information stored in the ring buffer; an information saving device (106) that extracts, upon receiving the save request information from the information recording devices, the status information from the ring buffer, to store the extracted status information in the save memory as the abnormal-status information.

The present invention provides an information collecting server for collecting abnormal-status information representing a status upon occurrence of an abnormal state from information recording devices each including a ring buffer for repeatedly storing therein information and a save memory for storing information separately therefrom, the information collecting server including: an information accumulation device (for example, realized by image database 204) that accumulates information; a collection-request receiving device (for example, realized by collection-request receiving device 201) that receives collection request information requesting collection of information from any of the information recording devices via a communication network; an on-server offer requesting device (for example, realized by image-offer-request transmission device 202) that transmits offer request information requesting offer of information to the information recording devices via the communication network if the collection-request receiving device receives the collection request information; and an information registry device (for example, realized by offered-image receiving device 203) that allows the information accumulation device to store therein the abnormal-status information received from any of the information recording devices.

The present invention provides an information recording method for recording abnormal-status information representing a status upon occurrence of an abnormal state, the method including the steps of: repeatedly storing, into a ring buffer in a first information recording device (for example, realized by drive recorder 10 on accident vehicle), status information representing a status of a vicinity of the first information recording device; transmitting, from the first information recording device to a second information recording device (for example, realized by drive recorder 10 on a target vehicle), save request information requesting save of status information stored in the ring buffer; extracting in the second information recording device, upon receiving the save request information from the first information recording device, the status information from the ring buffer; and allowing a save memory in the second information recording device that saves information separately from the ring buffer to save the status information extracted from the ring buffer as abnormal-status information.

The information recording method may further include the steps of: transmitting collection request information requesting collection of information from the first information recording server to an information collecting server via a communication network; transmitting, upon receiving the collection request information from the first information recording device in the information collecting server, offer request information requesting offer of information from the information collecting server to a second information recording device via the communication network; extracting, upon receiving the offer request information in the second information recording device from the information collecting server, the abnormal-status information from the save memory (107) in the second information recording device; transmitting the abnormal-status information extracted from the save memory to the information collecting server via the communication network from the second information recording device; and storing, in a database (204) in the information collecting server, the abnormal-status information received from the second information recording device.

The present invention provides an information collecting program for collecting abnormal-status information representing a status upon occurrence of an abnormal state from information recording devices each including a save memory for storing information separately from a ring buffer that repeatedly stores therein information, wherein the program causes a computer including an information accumulation device for accumulating information to execute the processings of: receiving collection request information requesting collection of information from any of the information recording devices via a communication network; transmitting, upon receiving the collection request information, offer request information requesting offer of information to the information recording devices via the communication network; and allowing an information accumulation device to store therein the abnormal-status information received from the information recording devices.

In accordance with the present invention, the information recording device saves the status information extracted from the ring buffer based on the save request information received from the information recording devices into the save memory. Accordingly, in addition to the information acquired by the own information recording device upon occurrence of an accident, the information acquired by the information recording devices that existed in the vicinity of the spot at which the abnormal state occurred can be also recorded. Thus, not only the information obtained at the incident spot of the abnormal state but also the information obtained in the vicinity of the incident spot of the abnormal state can be recorded upon occurrence of the abnormal state.

The configuration wherein the information collecting server collects information upon occurrence of the abnormal state from information recording devices for accumulation thereof, if employed in the present invention, can reduce the cost for the information recording devices as compared to the case where information is collected by performing communication between the information recording devices.

The configuration wherein the information recording devices include an information refusal judgment device that judges permission or refusal of offering the information, if employed in the present invention, can allow the user to refuse offering of information when the user does not wish the own location to be known by nearby persons.

The configuration wherein the information recording devices include an anonymizing device, if employed in the present invention, allows the user to offer the information with the user name being anonymized, if the user does not wish the own location to be known by nearby persons.

BEST MODE OF CARRYING OUT THE INVENTION

First Exemplary Embodiment

Figure 1:
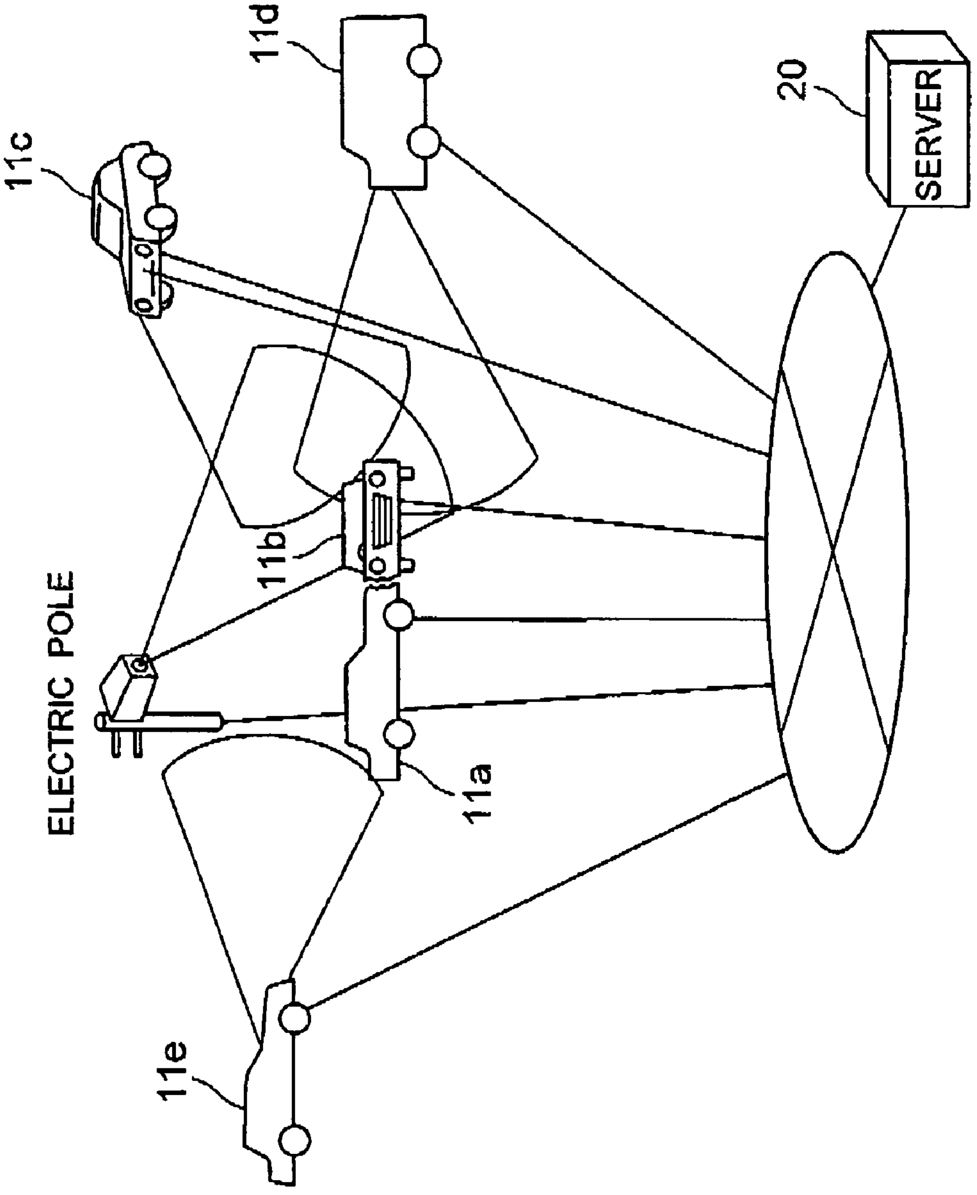
FIG. 1 is an explanatory diagram showing the concept of an information recording system.

Hereinafter, a first exemplary embodiment of the present invention will be described with reference to the drawings. First, the concept of the information recording system according to the present invention will be described. FIG. 1 is an explanatory diagram showing the concept of the information recording system. In the information recording system, each vehicle (for example, car, motorcycle, or train) 11*a*-11*e* mounts thereon a drive recorder, and repeatedly takes a surrounding image (for example, front and rear of the vehicle). If an accident occurs, the drive recorder on vehicles 11*a* and 11*b* that are involved with the accident will detect the impact by the accident, to record in the save memory the image within several seconds before and after occurrence of the accident.

In addition, the drive recorder on vehicles 11*a* and 11*b* involved with the accident transmits, upon detecting the impact by the accident, a request of image save to nearby vehicles 11*c*-11*e*. The drive recorder mounted on the nearby vehicles 11*c*-11*e* saves (records), upon receiving the request of image save, into the save memory the image within several seconds before and after receipt of the save request. In addition, the drive recorder mounted on the nearby vehicles 11*c*-11*e*, after saving the image, offers (transmits) the saved image to the accident vehicles 11*a* and 11*b* upon request therefrom.

The information recording system may include a server. In this case, the drive recorder mounted on the nearby vehicles 11*c*-11*e* transmits the saved image to the server via a communication network. The server accumulates the images upon occurrence of the accident collected from respective vehicles.

The drive recorder mounted on each vehicle 11*a*-11*e* requests the save/offer of image and delivers data as by performing a P2P-type communication (for example, vehicle-to-vehicle communication). The drive recorder mounted on each vehicle 11*a*-11 and the server request the save/offer of image and deliver the data therebetween via, for example, a communication network (for example, the Internet or network using G-Book service (trademark) provided by Toyota Motor Corp.

The recording is not limited to the image taken by the vehicle, and may be performed, for example, to images such as taken by a monitor camera placed on an electric pole, a shopping street (for example, store) and a railroad crossing. In addition, the recording may be performed to images and information taken by a digital camera, camera-attached portable telephone or security terminal carried by a person.

Figure 2:
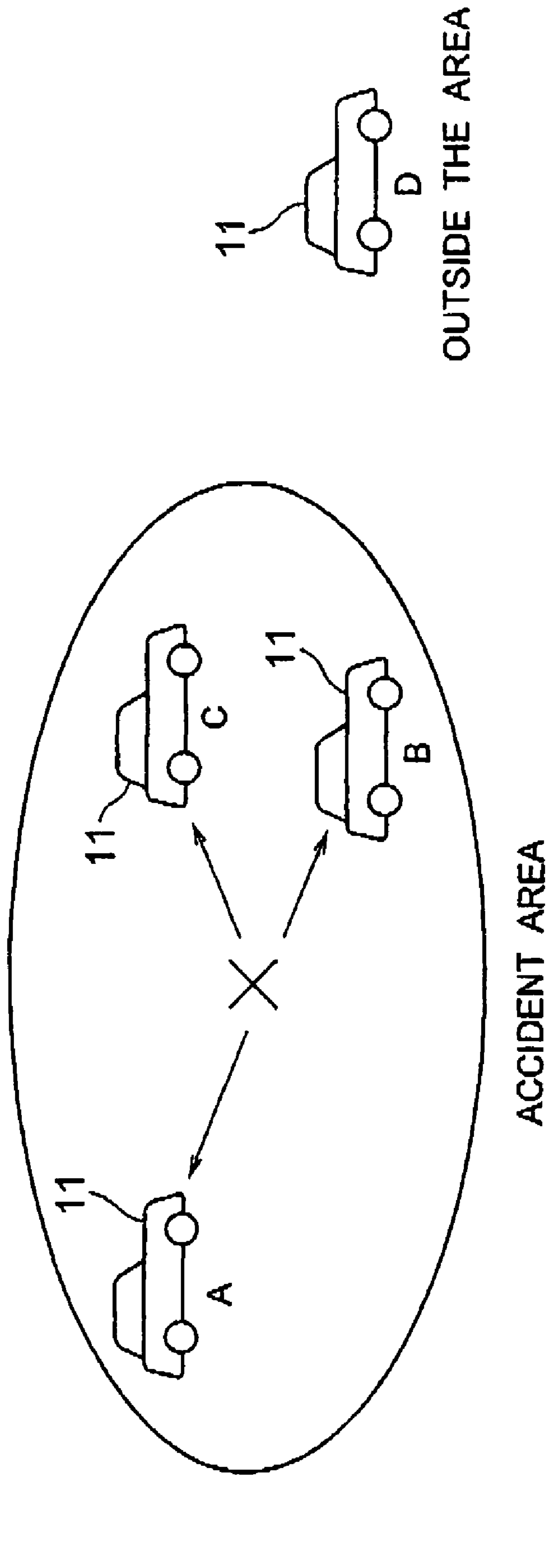
FIG. 2 is an explanatory diagram showing an example of the information recording system using a P2P-type communication procedure.

Now, description will be given to a case where the information recording system is realized using a P2P-type communication scheme such as a vehicle-to-vehicle communication system. FIG. 2 is an explanatory diagram showing an example of the information recording system using the P2P-type communication. In this exemplary embodiment, the information recording system includes a plurality of drive recorders mounted on the vehicles 11. More specifically, the information recording system includes a drive recorder for each vehicle. The drive recorder mounted on each vehicle 11 uses a vehicle-to-vehicle communication, to perform reciprocal transmission.

Although the present embodiment is described with respect to the use of a drive recorder mounted on a vehicle, the information recording system may also include a recorder that records sound and running data upon occurrence of an accident as an information recording device.

Figure 3:
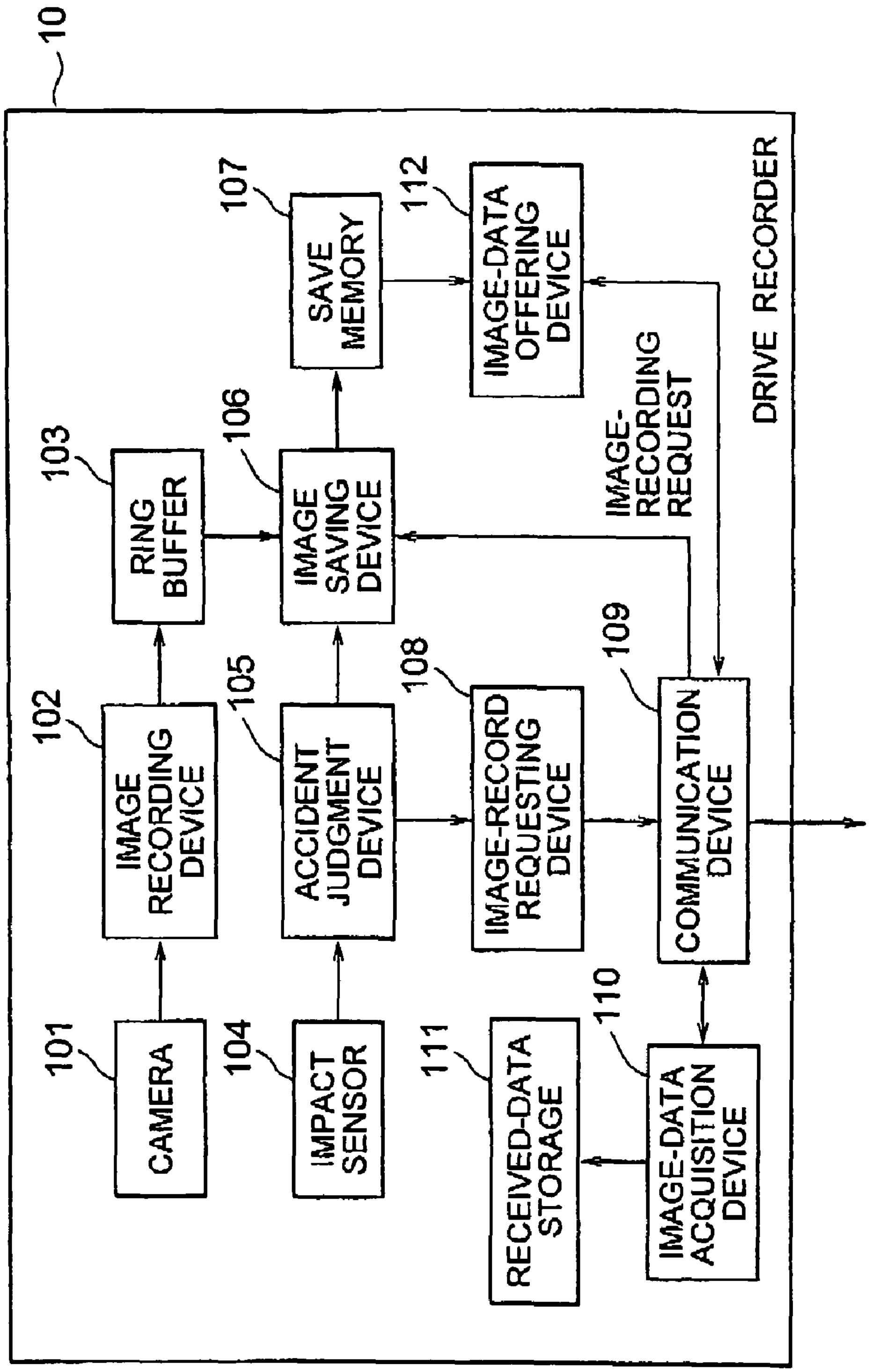
FIG. 3 is a block diagram showing an example of configuration of the drive recorder mounted on a vehicle.

FIG. 3 is a block diagram showing an example of configuration of the drive recorder mounted on a vehicle 11. As shown in FIG. 3, the drive recorder 10 includes an image recording device 102, a ring buffer 103, an impact sensor 104, an accident judgment device 105, an image saving device 106, a save memory 107, an image-record requesting device 108, a communication device 109, an image-data acquisition device 110, a received-data storage unit 111 and an image-data offering device 112.

A camera 101 is installed at the position which allows the image of the front and rear as well as the surrounding area of the vehicle to be taken, and has a function of taking the image during running of the vehicle. The drive recorder 10 may include an audio input unit such as a microphone, through which sound may be repeatedly input during running of the vehicle.

The image recording device 102 is realized practically by a control section of the drive recorder 10 which operates according a program. The image recording device 102 has a function of storing, in a ring buffer 103, the image repeatedly taken by the camera 101 during running of the vehicle. In this case, the image recording device 102 repeatedly stores the image from the camera 101, by allowing the ring buffer 103 to overwrite the image for storage.

The ring buffer 103 stores the image taken by the camera 101, according to the instruction by the image recording device 102. The ring buffer 103 repeatedly overwrites the image taken by the camera 101 for storage of the image. Therefore, the image stored in the ring buffer 103 disappears due to the overwrite after a specified time length elapses.

The impact sensor 104 has a function of detecting the impact caused by an accident, to output a detection signal. The drive recorder 10 may include a sensor that detects the driver's biological information (cardiac rate and body temperature). The drive recorder 10 may include a manual operation button for allowing depression thereof by a driver upon occurrence of an accident, etc. The drive recorder 10 may include a sensor that acquires (detects) position information using GPS and driver's biological information.

The accident judgment device 105 is realized practically by the control section of the drive recorder 10 that operates according the program. The accident judgment device 105 has a function of judging whether or not an accident occurred, based on the detection signal from the impact sensor 104. If the accident judgment device 105 has a function of instructing, upon judging occurrence of an accident, the image saving device 106 to save the image. If the drive recorder 10 includes a sensor for detecting biological information, the accident judgment device 105 may instruct the image saving device 106 to save the image, based on the fact of detecting a change of the biological information. The accident judgment device 105 has a function of instructing the image-record requesting device 108 to transmit an image recording request, based on the fact of judging occurrence of the accident.

The image saving device 106 is realized practically by the control section of the drive recorder 10 which operates according the program. The image saving device 106 has a function of extracting the image within several seconds before and after occurrence of the accident among the images stored in the ring buffer 103, based on the instruction of image saving from the accident judgment device 105. In this case, for example, the image saving device 106 extracts, from the ring buffer 103, the image of a specific time interval (for example, several seconds) before receiving the instruction of image saving and of a specific time interval (for example, several seconds) after receiving the instruction of image saving, after receiving the instruction of image saving.

The image saving device 106 has a function of receiving an image recording request from a drive recorder mounted on another vehicle, via a communication device 109. The image saving device 106 also has a function of extracting the image within several seconds before and after occurrence of an accident among the images stored in the ring buffer 103, based on a received request of the image saving. In this case, the image saving device 106, upon receiving an image recording request, extracts from the ring buffer 103 the image of a specific time interval (for example, several seconds) before the receipt of request of the image saving, and of a specific time interval (for example, several seconds) after the receipt of image-recording request.

The image saving device 106 has a function of allowing the save memory 107 to store therein the extracted image. In this exemplary embodiment, the action of allowing the save memory 107 to store therein the image extracted from the ring buffer 103 is referred also to as saving the image.

The save memory 107 is realized practically by a storage unit, such as a flash memory. The save memory 107 saves the image which constitutes the target for saving according to the instruction from the image saving device 106.

The image-record requesting device 108 is realized practically by the control section of the drive recorder 10 which operates according the program. The image-record requesting device 108 has a function of transmitting an image-recording request that requests recording of an image to a drive recorder mounted on another vehicle, via a communication device 109 based on the instruction from the accident judgment device 105. The image-record requesting device 108 has a function of transmitting a request of image offering that requests offering of the recorded image to a drive recorder mounted on another vehicle, via the communication device 109.

The communication device 109 is realized practically by a transmitter/receiver section including an antenna for transmitting/receiving a wireless signal and a decoder. The communication device 109 has a function of transmitting/receiving a variety of information to/from a drive recorder mounted on another vehicle.

The image-data acquisition device 110 is realized practically by the control section of the drive recorder 10 which operates according the program. The image-data acquisition device 110 has a function of receiving an image from a drive recorder mounted on another vehicle, via the communication device 109. The image-data acquisition device 110 has a function of allowing the received-data storage unit 111 to therein store the received image.

The received-data storage unit 111 is realized practically by a storage unit such as a memory. The received-data storage unit 111 stores therein the image received from a drive recorder mounted on another vehicle. The save memory and the received-data storage unit 111 may be configured by a common memory device.

The image-data offering device 112 is realized practically by the control section of the drive recorder 10 which operates according the program. The image-data offering device 112 has a function of receiving a request of the image offering from a drive recorder mounted on another vehicle, via the communication device 109. The image-data offering device 112 has a function of extracting the image saved in the save memory 107 upon receiving a request of the image offering. The image-data offering device 112 has a function of transmitting via the communication device the extracted image to a drive recorder on the vehicle from which the request of image offering is issued.

Figure 4:
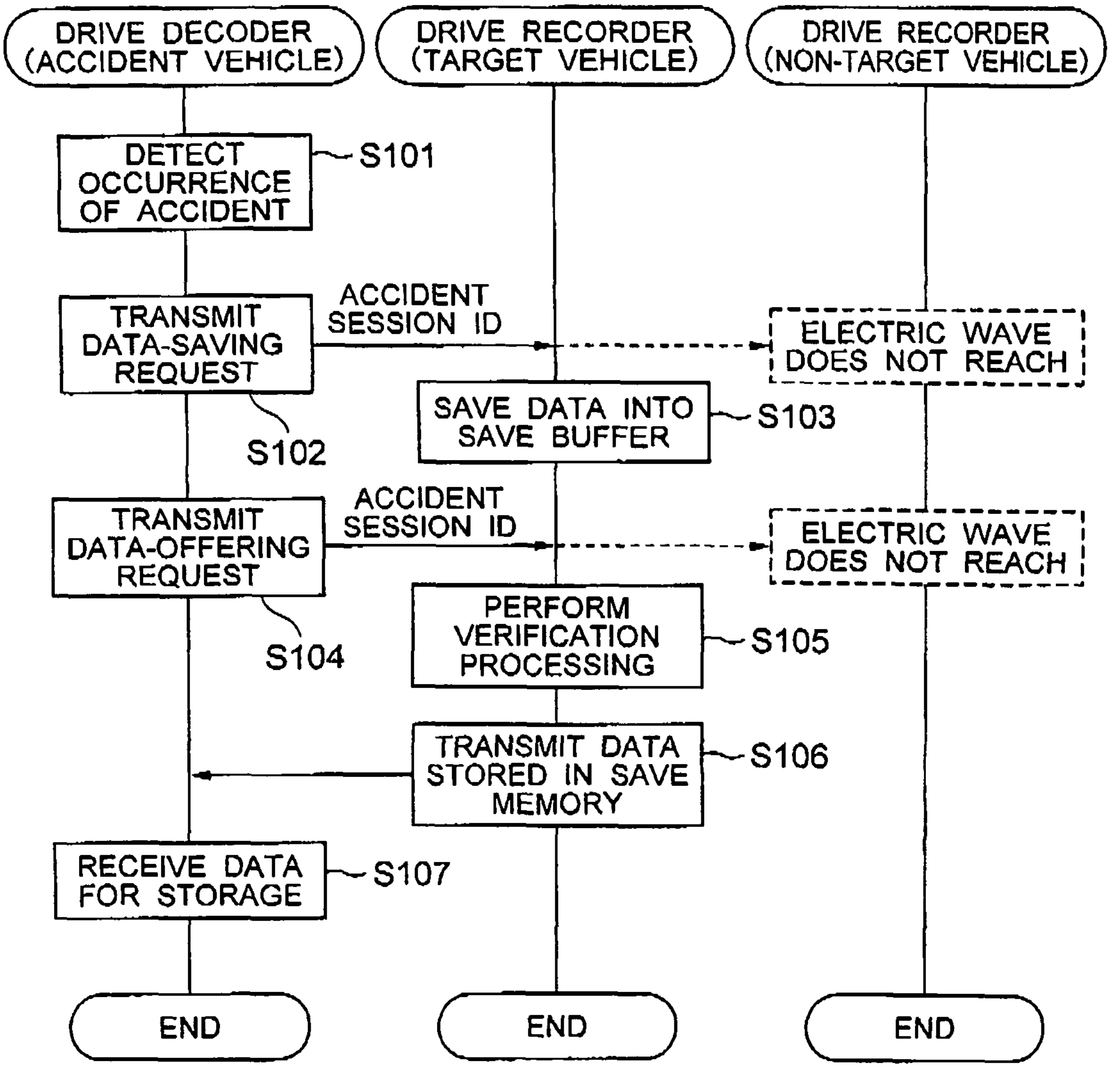
FIG. 4 is a flowchart showing the procedure of recording an image in the information recording system upon occurrence of an accident.

Operation will be described hereinafter. FIG. 4 is a flowchart showing an example of the procedure for recording the image upon occurrence of an accident in the information recording system. If an accident, such as collision between vehicles, occurs, the accident judgment device 105 of a drive recorder 10 mounted on the vehicles involved with the accident (may be referred to as accident vehicle, hereinafter) will detect the occurrence of accident based on a detection signal by the impact sensor 104 (step S101). Then, the image saving device 106 extracts an image from the ring buffer 103 based on the instruction from the accident judgment device 105, to save the image into the save memory 107.

The image-record requesting device 108 transmits an image-recording request to another drive recorder of other vehicles according to the instruction from the accident judgment device 105 (step S102). In this case, the image-record requesting device 108 may transmit the image-recording request to the drive recorder of the other vehicles via a driver recorder of one or plurality of another vehicles, without directly transmitting the image-recording request to the drive recorder of the other vehicles. That is, the image-record requesting device 108 may transmit the image-recording request to the drive recorder of the other vehicles by using a communication technique referred to as a multi-hop communication scheme.

In step S102, the image-record requesting device 108 creates an ID for specifying the accident which the accident vehicle caused (referred to as accident session ID, hereinafter), and transmits an image-recording request including the thus created accident session ID as a radio signal. The image-record requesting device 108, upon transmitting the image-recording request, may transmit notice information for notifying that the own vehicle caused the accident to a server or terminal, which the insurance company manages, via a communication network.

Generally, a vehicle that was running in the vicinity of the accident vehicle (for example, before or after the accident vehicle) and has taken the image of the accident spot, referred to as target vehicle hereinafter, is running across the location at which the target vehicle can receive the radio signal from the accident vehicle. Thus, the drive recorder 10 of the target vehicle receives the image-recording request from the drive recorder 10 of the accident vehicle. On the other hand, the electric wave does not reach another vehicle which was running far from the accident vehicle and thus has not taken the image, which may be referred to as non-target vehicle hereinafter. Therefore, as shown in FIG. 4, the drive recorder 10 of the non-target vehicle cannot receive the image-recording request from the drive recorder 10 of the accident vehicle.

The image saving device 106 of the drive recorder 10 on the target vehicle receives the image-recording request from the drive recorder 10 of the accident vehicle. Then, the image saving device 106 extracts an image from the ring buffer 103 based on the received image-recording request, to save the same into the save memory 107 (step S103). In this case, the image saving device 106 stores the image in the save memory 107 in association with the accident session ID included in the image-recording request. The image saving device 106, if it includes a sensor for receiving probe information including the position information based on GPS or biological information, may save the probe information into the save memory 107 in addition to the image.

As described heretofore, by performing the procedure of steps S10 to S103, the image upon occurrence of the accident is stored in the drive recorder 10 of the accident vehicle, and the image upon occurrence of the accident is stored in the drive recorder 10 of the target vehicle which was running in the vicinity of the accident spot.

The image-record requesting device 108 of the accident vehicle transmits an image-offering request to the drive recorder of the other vehicle (step S104). In this case, the image-record requesting device 108 may transmit the image-offering request to the drive recorder of the other vehicles via a driver recorder of another vehicle, without transmitting the image-offering request directly to the drive recorder of the other vehicles, via a communication technique referred to as multi-hop communication scheme.

In step S104, the image-record requesting device 108 transmits the image-offering request including the accident session ID as a radio signal. In this case, the target vehicle is generally running in the area where the target vehicle can receive the radio signal from the accident vehicle, and the drive recorder 10 of the target vehicle receives the image-offering request from the drive recorder 10 of the accident vehicle. On the other hand, since the electric wave does not reach the non-target vehicle from the accident vehicle, the non-target vehicle cannot receive the image-offering request from the drive recorder 10 of the accident vehicle, as shown in FIG. 4.

The image-data offering device 112 of the drive recorder 10 on the target vehicle performs a verification processing based on the image-offering request thus received (step S105). In this case, the image-data offering device 112 judges whether or not there is an ID that matches the accident session ID included in the image-offering request, among accident session IDs stored in the save memory 107. If it is judged that there is a matched accident session ID, the image-data offering device 112 judges that it can offer an image to the drive recorder 10 of the accident vehicle. If it is judged that there is no matched accident session ID, the image-data offering device 112 judges that it cannot offer an image to the drive recorder 10 of the accident vehicle.

The image-data offering device 112, upon judging that it can offer an image to the drive recorder 10 of the accident vehicle, extracts the image from the save memory 107. In this case, the image-data offering device 112 extracts an image corresponding to the accident session ID included in the image-offering request among images stored in the save memory 107 stores. The image-data offering device 112 transmits the extracted image to the drive recorder 10 of the accident vehicle as a radio signal (step S106). In this case, the image-data offering device 112 may transmit the image together the user ID (for example, address information) which can specify the user of vehicle that offered the image.

In step S106, the image-data offering device 112 of the target vehicle may transmit the image to the drive recorder of the accident vehicle via driver recorder of one or a plurality of another vehicle, without transmitting the image directly to the drive recorder of the accident vehicle. That is, the image-data offering device 112 may transmit the image to the drive recorder of the accident vehicle via a communication technique referred to as multi-hop communication scheme.

The image-data acquisition device 110 of the drive recorder 10 on the accident vehicle receives the image as a radio signal from the drive recorder 10 of the target vehicle. The image-data acquisition device 110 allows the received-data storage unit 111 to store therein the thus received image (step S107).

The image upon occurrence of the accident that is stored in the save memory 107 and received-data storage unit 111 is later offered to organizations for performing the accident investigation including an insurance company. In this case, for example, the drive recorder 10 transmits the image stored in the save memory 107 or received-data storage unit 111 via a communication network to the server or terminal managed by the organizations that perform accident investigation such as an insurance company. For example, a user may remove the drive recorder (storage unit) 10 that recorded the image upon occurrence of the accident, to submit the same directly to the organizations including the insurance company that performs the accident investigation.

As described above, according to the present embodiment, the drive recorder 10 of the accident vehicle, upon detecting occurrence of an accident, saves the image for the predetermined time interval before and after occurrence of the accident into the save memory 107. In addition, the drive recorder 10 of the accident vehicle transmits an image-recording request to the drive recorder 10 of a target vehicle. Thereafter, the drive recorder 10 of the target vehicle, upon receiving the image-recording request, saves the image for the predetermined time interval before and after occurrence of the accident into the save memory 107. Therefore, in addition to the image that the drive recorder 10 of the accident vehicle taken, the image that the drive recorder 10 of the target vehicle existing in the vicinity of the accident spot taken can be also recorded. Therefore, upon occurrence of an abnormal state, in addition to the status information obtained in the incident site of the abnormal state, information obtained in the vicinity the incident site of the abnormal state can be recorded.

According to the present embodiment, the drive recorder 10 which received the save command saves the image (moving image) stored in the ring buffer 103 into the save memory 107, which does not perform an overwrite processing. Therefore, it is possible to prevent the image upon occurrence of the accident from being erased by an overwrite processing.

According to the present embodiment, the drive recorder 10 includes a device for saving an image based on the image-recording request from the outside. Therefore, even if the own vehicle does not detect an impact, an image of the vicinity (for example, front side) of the accident of the own vehicle can be recorded. More specifically, the drive recorder 10 includes a device (antenna and decode device) that can receive an urgent request signal (image-recording request) in an electric wave, and upon receiving a specific request signal, saves the image into the save memory 107, which does not perform an overwrite processing. The drive recorder 10 may include an output device (for example, indicator such as an LED) for notifying the driver that the image is saved, and an input device (for example, manual operation button) for inputting the permission or refusal of saving the image.

Figure 5:
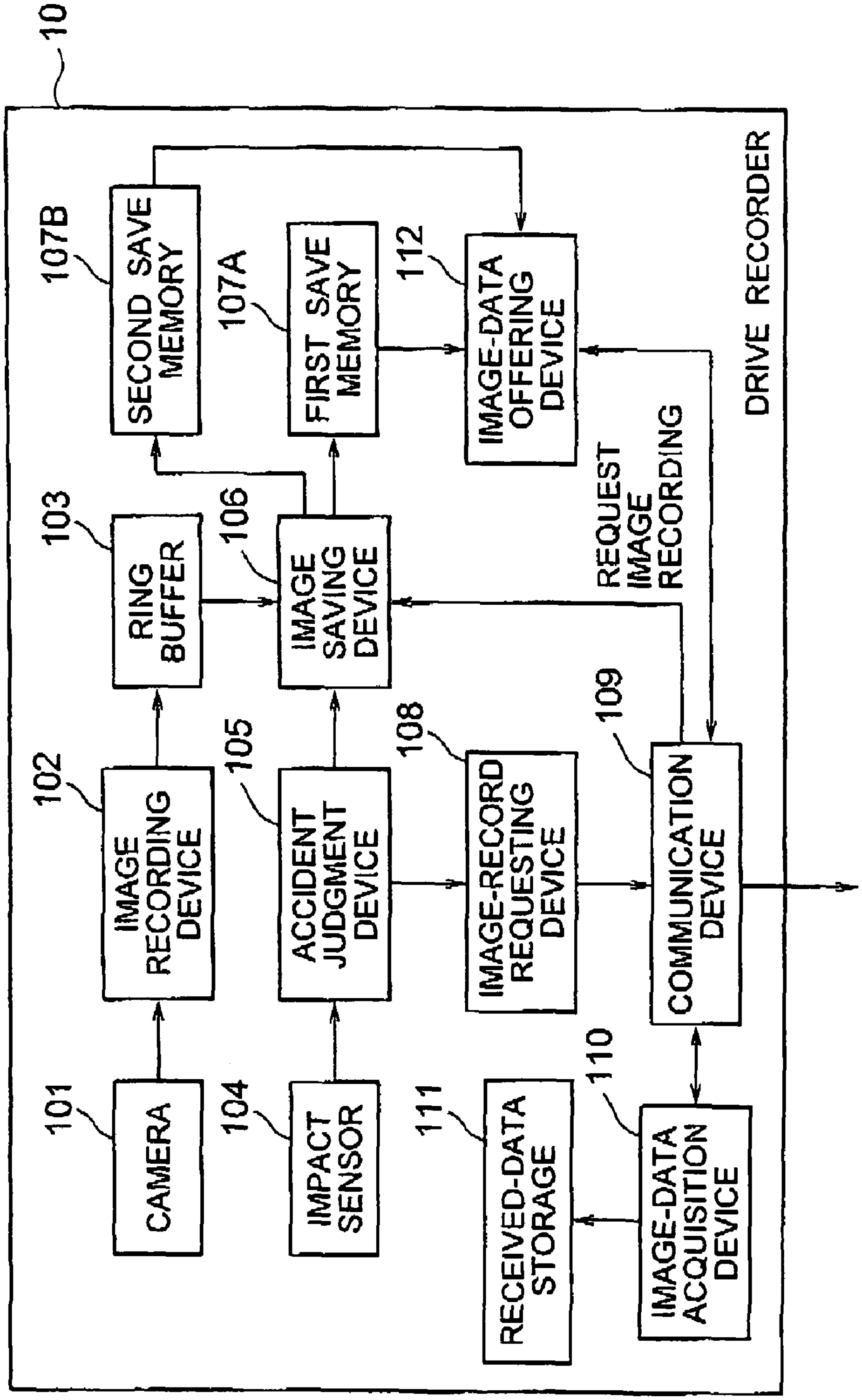
FIG. 5 is a block diagram showing an example of configuration of the drive recorder including two save memories.

In the exemplary embodiment described above, the drive recorder 10 includes a single save memory 107 for saving therein information: however, the drive recorder 10 may include a plurality of save memories. FIG. 5 is a block diagram showing an example of configuration of the drive recorder in case of including two save memories. In this case, for example, the image saving device 106 saves the image extracted from the ring buffer 103 into a first save memory 107A based on the fact of having received an image-recording request from another vehicle. Thereafter, the image saving device 106 saves the image extracted from the ring buffer 103 into a second save memory 107B, if the accident judgment device 105 detects occurrence of the accident. The configuration as described heretofore allows the vehicle to save, upon occurrence of an accident which the own vehicle caused after saving the image of the accident site of the other vehicle, the image of the accident site of the own vehicle in addition to the image of the accident site of the other vehicle.

Second Exemplary Embodiment

Next, a second exemplary embodiment of the present invention will be described with reference to the drawings. In the first exemplary embodiment, a case is described where the drive recorder of the accident vehicle collected and saved the image that the target vehicle has taken; however, the image may be collected by a server on the network. In this exemplary embodiment, a case will be described where the server on the network collects for accumulation the image upon occurrence of the accident from each vehicle based on a request from the drive recorder of the accident vehicle.

Figure 6:
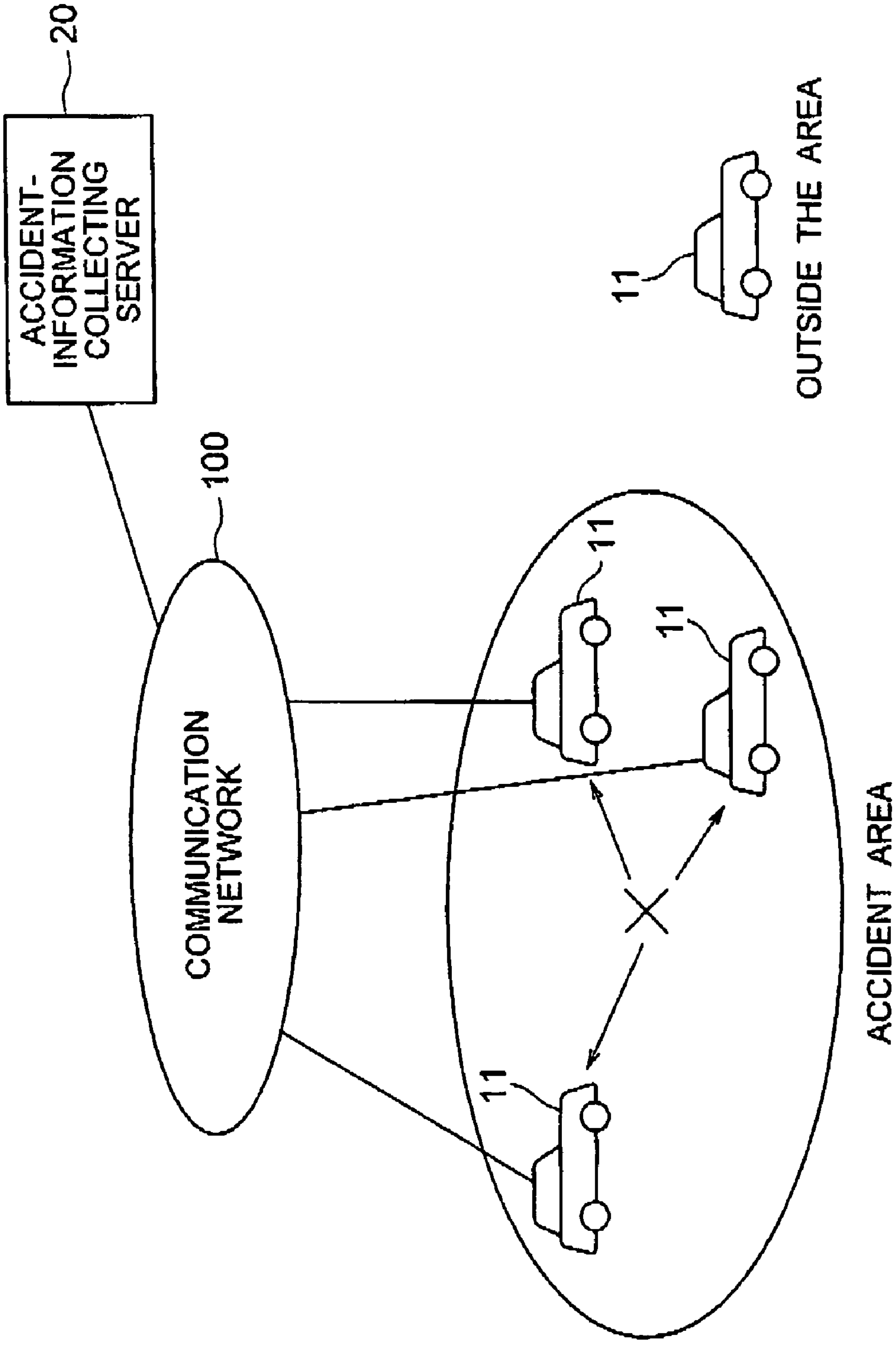
FIG. 6 is an explanatory diagram showing an example of the information recording system in case of communicating via a communication network.

FIG. 6 is an explanatory diagram showing an example of the information recording system in the case of communicating via a communication network. In this exemplary embodiment, the information recording system includes a plurality of drive recorders mounted on vehicles 11 similarly to the first embodiment. That is, the information recording system includes a drive recorder on each of the vehicles. As shown in FIG. 6, the information recording system further includes an accident-information collecting server 20. The drive recorder mounted on each vehicle 11 and the accident-information collecting server 20 communicate with one another via a communication network 100.

Each drive recorder and the accident-information collecting server 20 communicate with one another via the communication network 100 such as a network using the Internet, or G-Book service. In this exemplary embodiment, the communication between each two the drive recorders is performed using a vehicle-to-vehicle communication.

Figure 7:
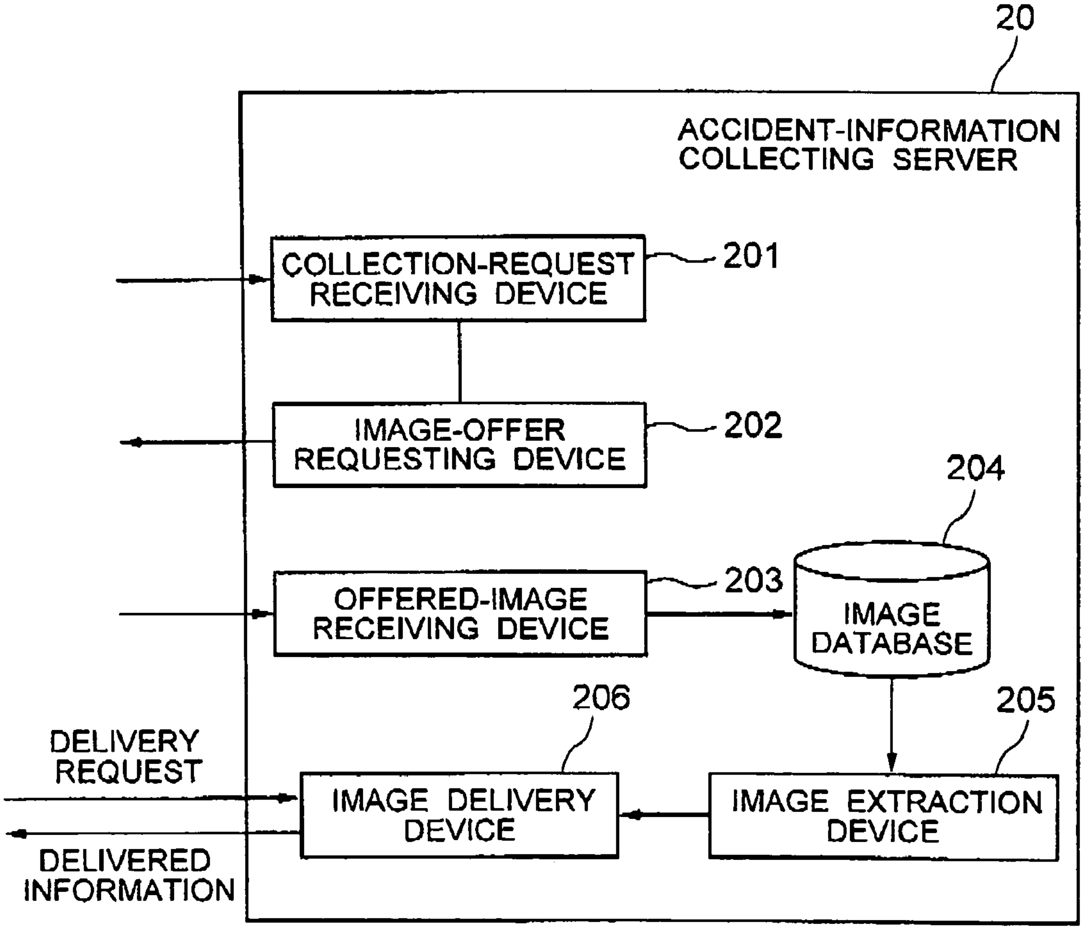
FIG. 7 is a block diagram showing an example of configuration of the accident-information collecting server.

The accident-information collecting server 20 is realized practically by an information processor, such as a workstation and a personal computer. FIG. 7 is a block diagram showing an example of configuration of the accident-information collecting server. As shown in FIG. 7, the accident-information collecting server 20 includes a collection-request receiving device 201, an image-offer-request transmission device 202, offered-image receiving device 203, an image database 204, an image extraction device 205, and an image delivery device 206.

The collection-request receiving device 201 is realized practically by a CPU and a network interface section of the information processor which operates according the program. The collection-request receiving device 201 has a function of receiving the image-collection request that requests collection of the image upon occurrence of the accident from the drive recorder 10 of the accident vehicle via the communication network 100.

The image-offer-request transmission device 202 is realized practically by the CPU and the network interface section of the information processor which operate according the program. The image-offer-request transmission device 202 has a function of transmitting the image-offering request to the drive recorder 10 of each vehicle via the communication network 100 based on the fact of the collection-request receiving device 201 having received the image-collection request.

The offered-image receiving device 203 is realized practically by the CPU and network interface section of the information processor which operates according the program. The offered-image receiving device 203 has a function of receiving the image upon occurrence of the accident from the drive recorder 10 of the target vehicle via the communication network 100. The offered-image receiving device 203 has a function of storing the received image in the image database 204.

The image database 204 is realized practically by a database unit, such as a magnetic disk drive and an optical disk drive. The image database 204 accumulates the image upon occurrence of the accident taken by each vehicle. In this case, the image database 204 stores the image upon occurrence of the accident in association with the accident session ID and user ID of the user of the vehicle that offered the image.

The image extraction device 205 is realized practically by the CPU of the information processor which operates according the program. The image extraction device 205 has a function of extracting the image from the image database 204, based on the image-delivery request received by the image delivery device 206.

The image delivery device 206 is realized practically by the CPU and network interface section of the information processor which operate according the program. The image-delivery device has a function of receiving the image-delivery request that requests the image delivery via the communication network 100. In this exemplary embodiment, the image delivery device 206 receives the image-delivery request via the communication network 100 from the terminal managed by the organization which performs an accident investigation including an insurance company. The image delivery device 206 has a function of transmitting the image extracted by the image extraction device 205, via the communication network 100. In this exemplary embodiment, the image delivery device 206 transmits via the communication network 100 an image to the terminal managed by the organization including an insurance company, which performs an accident investigation.

In this exemplary embodiment, the basic functions of the drive recorder 10 are similar to those of the drive recorder 10 shown in the first exemplary embodiment. However, in this exemplary embodiment, the communication device 109 of the drive recorder 10, upon performing communication with the accident-information collecting server 20, transmits and receives a variety of information via the communication network 100. The image-record requesting device 108 transmits the image-collection request to the accident-information collecting server 20 via the communication network 100 instead of the image-offering request.

In this exemplary embodiment, the storage unit of the accident-information collecting server 20 stores therein a variety of programs for collecting the images upon occurrence of the accident. For example, the storage unit of the accident-information collecting server 20 stores therein an information-collecting program that allows the computer to perform the processings of receiving the collection-request information that requests collection of information from any of the information storage units via the communication network, transmitting the offer-request information that requests offer of information via the communication network to each of the information storage units, and storing the abnormal-status information received from any of the information storage units into the information storage unit.

Figure 8:
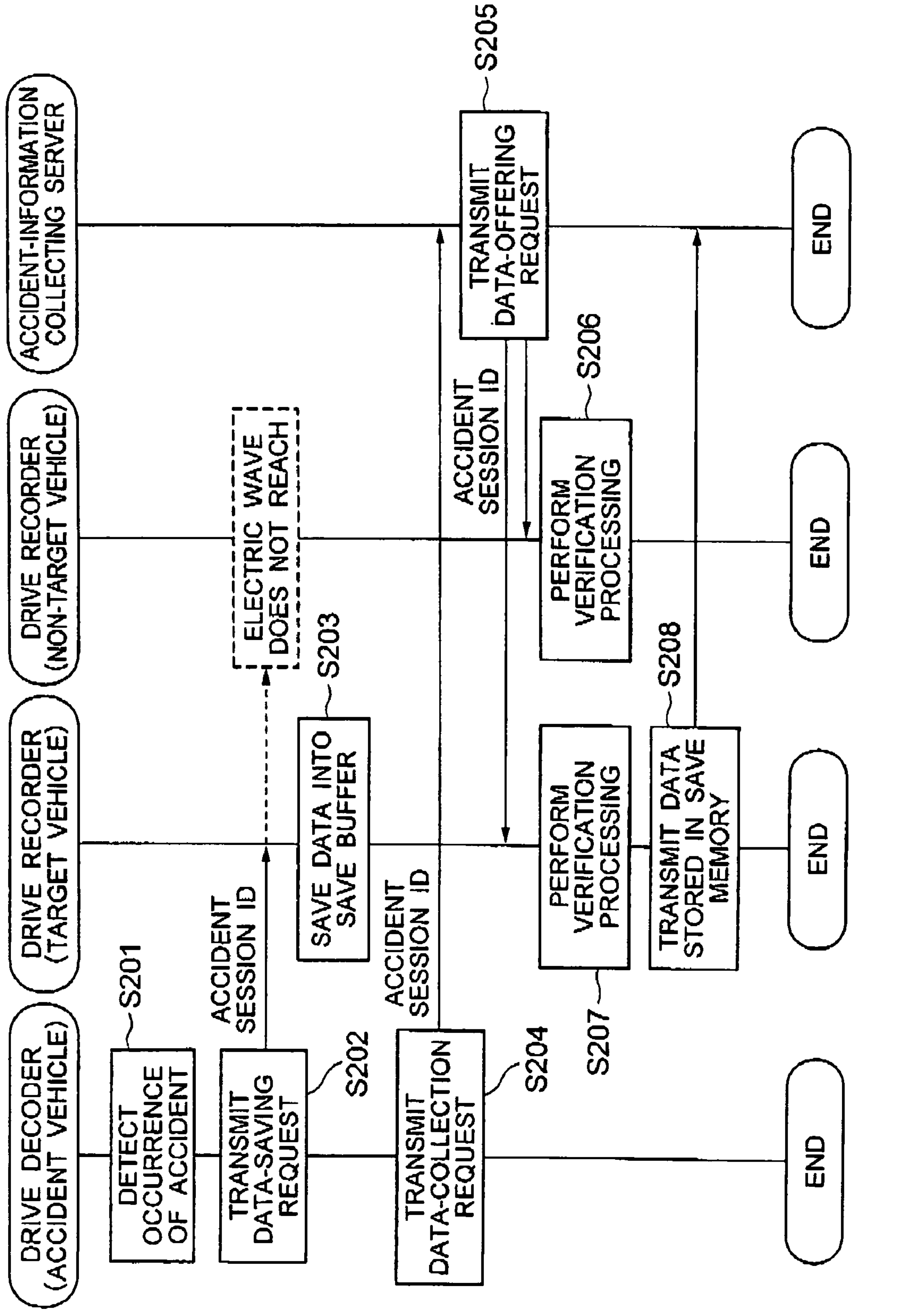
FIG. 8 is a flowchart showing another example of the procedure of recording an image in the information recording system upon occurrence of an accident.

Operation will be described hereinafter. FIG. 8 is a flowchart showing another example of the processing for recording the image upon occurrence of the accident in the information recording system. In this exemplary embodiment, the procedures of steps S201 to S203 are similar to those of steps S101 to S103 shown in the first exemplary embodiment.

The image-record requesting device 108 of the accident vehicle transmits the image-collection request that requests collection of the image upon occurrence of the accident to the accident-information collecting server 20 via the communication network 100 (step S204). In this case, the image-record requesting device 108 transmits the image-collection request including the accident session ID to the accident-information collecting server 20.

The timing for transmitting the image-collection request need not be immediately after occurrence of the accident, and may be on a later date. In addition, if the drive recorder 10 of the accident vehicle cannot transmit the information, a terminal other than the drive recorder 10 of the accident vehicle may transmit the information-collection request. The information-collecting request may be performed without using the communication network 100 so long as the accident-judgment ID (for example, accident session ID) can be extracted, and the extraction request is possible based on the ID thus extracted.

The collection-request receiving device 201 of the accident-information collecting server 20 receives the image-collection request via the communication network 100 from the drive recorder 10 of the accident vehicle. Then, the image-offer-request transmission device 202 transmits the image-offering request to the drive recorder 10 of each vehicle via the communication network 100 (step S205). In this case, the collection-request receiving device 201 transmits the image-offering request including the accident session ID to each drive recorder 10.

The image-data offering device 112 of the drive recorder 10 of each vehicle performs a verification processing based on the image-offering request received (steps S206 and S207). In this case, the image-data offering device 112 judges whether or not there is an ID matching the accident session ID included in the received image-offering request, among the accident session IDs saved in the save memory 107. The image-data offering device 112 of the non-target vehicle, which judges in step S206 that there is no matched accident session ID, judges that the image upon occurrence of the accident cannot be offered, to end the processing without a further processing. The image-data offering device 112 of the target vehicle, which judges in step S207 that there is a matched accident session ID, judges that the image upon occurrence of the accident can be offered.

The image-data offering device 112 of the target vehicle extracts an image corresponding to the accident session ID included in the image-offering request among the images saved in the save memory 107. The image-data offering device 112 transmits the extracted image to the accident-information collecting server 20 via the communication network 100 (step S208). In this case, the image-data offering device 112 transmits the accident session ID and user ID to the accident-information collecting server 20 together with the image.

In steps S205-S208, the drive recorder 10 of the accident vehicle may also perform the verification processing based on the accident session ID, extract the image from the save memory 107, and transmit the same to the accident-information collecting server 20.

The offered-image receiving device 203 of the accident-information collecting server 20 receives the image via the communication network 100 from the drive recorder 10 of the target vehicle. The offered-image receiving device 203 stores the received image received into the image database 204. In this case, the offered-image receiving device 203 allows the image database 204 to store therein the image in association with the accident session ID received together with the image.

In addition to the accident-information collecting server 20, the drive recorder 10 of the accident vehicle may also acquire the image from the drive recorder 10 of the target vehicle. In this case, the drive recorder 10 of the accident vehicle transmits the image-offering request to the drive recorder 10 of the target vehicle based on a processing similar to the processing of step S104 shown in the first embodiment. The drive recorder 10 of the accident vehicle saves the image received from the drive recorder 10 of the target vehicle in the received-data storage unit 111 based on a processing similar to the processing of step S107 shown in the first embodiment.

As described heretofore, by performing the processings of steps S204 to S208, the accident-information collecting server 20 collects the images upon occurrence of the accident from the drive recorder 10 of the target vehicles, and accumulate the same in the image database 204.

The accident-information collecting server 20 delivers the images accumulated in the image database 204 in accordance with a request from the organization, such as an insurance company, which performs an accident investigation. In this case, the image delivery device 206 of the accident-information collecting server 20 receives an image-delivery request via the communication network 100 from the server or terminal managed by the organization such as an insurance company, which performs the accident investigation. For example, the image delivery device 206 receives the image-delivery request including the accident session ID from the server or terminal managed by the organization such as an insurance company, which performs the accident investigation.

The image extraction device 205 extracts an image from the image database 204 based on the received image-delivery request. In this case, the image extraction device 205 extracts the image corresponding to the accident session ID included in the image-delivery request from the image database 204. The image delivery device 206 transmits, via the communication network 100, the image extracted by the image extraction device 205 to the server or terminal managed by the organization which performs the accident investigation.

The image extraction device 205 may perform a predetermined processing to the image extracted by the image database 204. The image delivery device 206 may transmit the image processed by the image extraction device 205 to the server or terminal managed by the organization such as an insurance company, which performs the accident investigation. For example, the image extraction device 205 may extract a plurality of images upon occurrence of the accident from the image database 204, and may create three-dimensional image data using a plurality of extracted images. For example, the image extraction device 205 may perform a processing that improves quality of the extracted image, if the image quality of the extracted image is degraded.

As described heretofore, according to this exemplary embodiment, the accident-information collecting server 20 collects for accumulation the images upon occurrence of the accident from the drive recorder 10 mounted on each vehicle. Therefore, the cost with respect to the drive recorder 10 can be reduced as compared to the case where the information is collected by performing only a P2P-type communication. Assuming that each vehicle communicates using the P2P-type communication, such as a vehicle-to-vehicle communication, for example, as described in the first exemplary embodiment, the drive recorder 10 must include a received-data storage unit 111 for storing therein images collected from other vehicles separately from the save memory 107. In addition, performing the vehicle-to-vehicle communication requires a larger electric power. Therefore, a cost is needed on the received-data storage unit 111 and power dissipation. In this exemplary embodiment, the accident-information collecting server 20 collects the images upon occurrence of the accident, instead of the drive recorder 10 on the accident vehicle, whereby cost on the drive recorder 10 can be reduced.

If collection of the information uses only a P2P-type communication, even the target vehicle existing in the vicinity of the accident spot upon occurrence of the accident may move to the area which the electric wave does not reach, to render impossible collection of the images upon occurrence of the accident. In this exemplary embodiment, the accident-information collecting server 20 collects the images upon occurrence of the accident, instead of the drive recorder 10 on the accident vehicle, thereby preventing the situation where collection of the images upon occurrence of the accident becomes impossible.

The accident-information collecting server 20 collects the images upon occurrence of the accident in this exemplary embodiment, instead of the drive recorder 10 on the accident vehicle, to thereby prevent the situation in which collection of the images upon occurrence of the accident becomes impossible, and which may occur due to an intentional destruction or missing of the recording device caused by the responsible person of the accident.

According to this exemplary embodiment, a variety of terminals can upload information on the accident-information collecting server 20 connected to the communication network 100. Therefore, in addition to the drive recorder 10, terminals, such as a monitor camera disposed in a shopping street or street crossing and a portable telephone carried by an individual, can upload the information on the accident-information collecting server 20.

Third Exemplary Embodiment

Next, a third exemplary embodiment of the present invention will be described with reference to the drawings. In this exemplary embodiment, a case where the server on a network collects for accumulation the images upon occurrence of the accident from each vehicle in response to a request from the drive recorder of the accident vehicle, similarly to the second exemplary embodiment.

Figure 9:
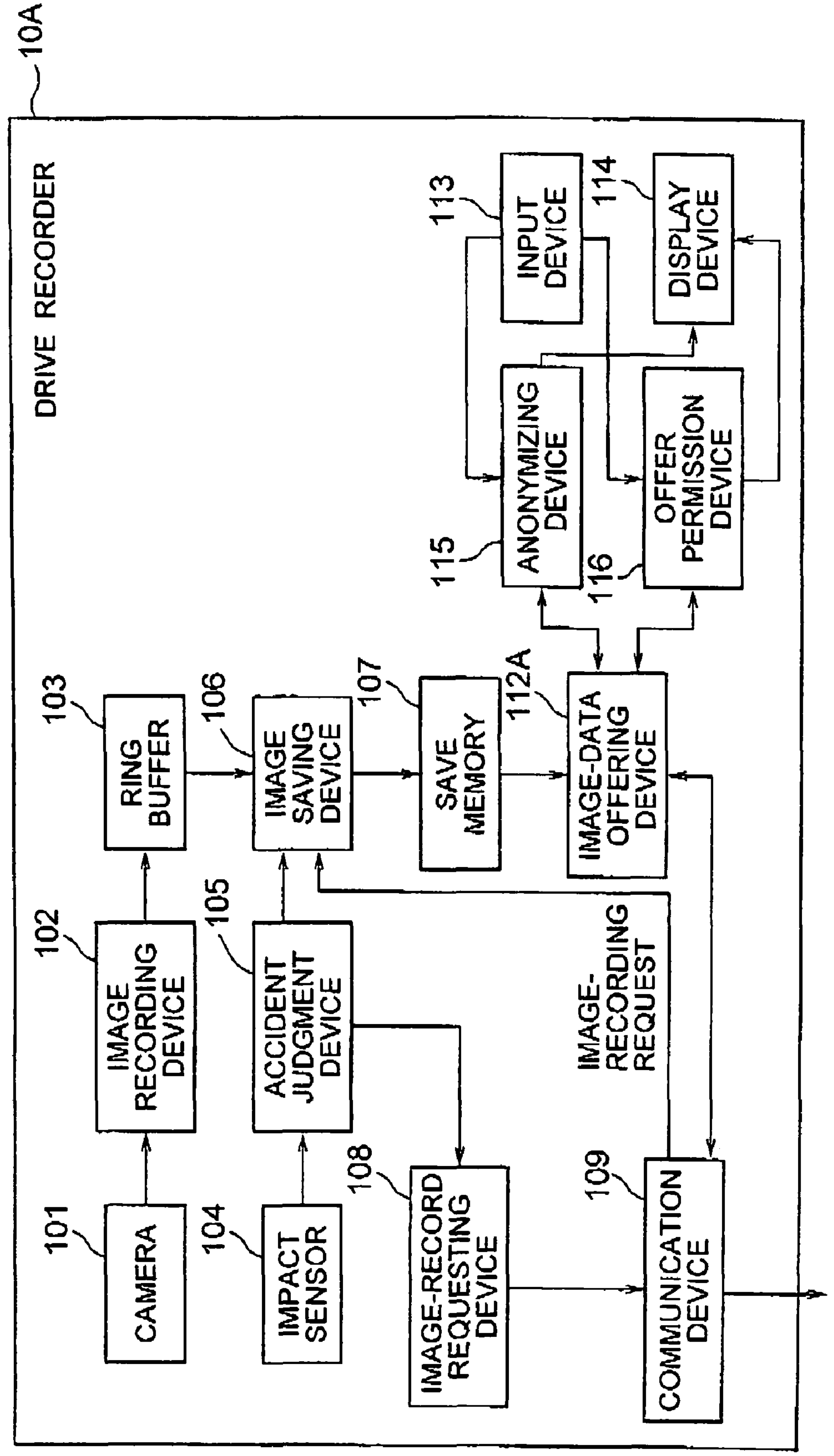
FIG. 9 is a block diagram showing another example of configuration of the drive recorder mounted on a vehicle.

FIG. 9 is a block diagram showing another example of configuration of the drive recorder mounted on a vehicle 11. This exemplary embodiment is different from the first exemplary embodiment in that the drive recorder 10A, as shown in FIG. 9, does not include the image-data acquisition device 110 and received-data storage unit 111 among the constituent elements of the drive recorder 10 shown in the first exemplary embodiment. This exemplary embodiment is also different from the first exemplary embodiment in that the drive recorder 10A includes, in addition to the constituent elements of the drive recorder 10 shown in the first embodiment, an input device 113, a display unit 114, an anonymizing device 115, and an offer permission device 116.

In this exemplary embodiment, the function of the image-data offering device 112 among the constituent elements of the drive recorder 10A is different from the function of the image-data offering device 112 shown in the first embodiment. In this exemplary embodiment, the function of the accident-information collecting server 20 is similar to the function of the accident-information collecting server 20 shown in the second embodiment.

The input device 113 is realized practically by a manual operation button etc. The input device 113 has a function of inputting an instruction that the user name be anonymized to perform the image offering (referred to as anonymizing instruction, hereinafter) based on a user's operation. The input device 113 has also a function of inputting an instruction that the image offering be permitted (referred to as offer permission instruction, hereinafter) based on a user's operation. For example, if the drive recorder 10A is connected to an information terminal, such as a car-navigation terminal, the input device 113 may be realized by an operation section of the information terminal.

The display device 114 is realized practically by an indicator, such as an LED. The display device 114 has a function of lighting for indication based on the instruction of anonymizing device 115 or offer permission device 116. For example, if the drive recorder 10A is connected to an information terminal, such as a car-navigation terminal, the display device 114 may be realized by a liquid crystal display section of the information terminal.

The image-data offering device 112A has a function of receiving an image-offering request from the drive recorder mounted on another vehicle, by using a communication device 109. The image-data offering device 112A has a function of instructing, upon receiving an image-offering request, the offer permission device 116 to ask the user whether or not the user permits offering of the image. The image-data offering device 112A has also a function of instructing the anonymizing device 115 to ask the user whether or not the image offering is to be anonymized.

The image-data offering device 112A has a function of extracting, upon permission of the image offering by the user, the image saved in the save memory 107. The image-data offering device 112A has also a function of transmitting via the communication device 109 the extracted image to the drive recorder of the vehicle that is requested to offer the image.

The anonymizing device 115 is realized practically by the control section of the drive recorder 10A which operates according the program. The anonymizing device 115 has a function of anonymizing the user name, upon offering the image saved in the save memory 107 in accordance with the instruction by the image-data offering device 112A. In this exemplary embodiment, the anonymizing device 115 allows the display device 114 to display a message of inducing an input as to whether or not anonymity of the user name is to be performed. The anonymizing device 115 has a function of inducing the input as to whether or not the anonymity of the user name is to be performed by turning ON the display device 114 configured by an LED, for example. The anonymizing device 115 has also a function of receiving an input of the anonymizing instruction from the input device 113. The anonymizing device 115 has also a function of judging that the user has specified anonymity based on the fact that anonymizing instruction has been received.

The offer permission device 116 is realized practically by the control section of the drive recorder 10A which operates according the program. The offer permission device 116 has a function of allowing the display device 114 to display inducement of the input as to whether or not the image offering is permitted based on the instruction from the image-data offering device 112A. For example, the anonymizing device 115 allows the display of inducement of the input as to whether or not the image offering is permitted, by turning ON the display device 114 configured by an LED. The offer permission device 116 has a function of receiving the instruction of offer permission from the input device 113. The offer permission device 116 has a function of judging that the user has permitted the image offering, based on an input of instruction of the offer permission.

Figure 10:
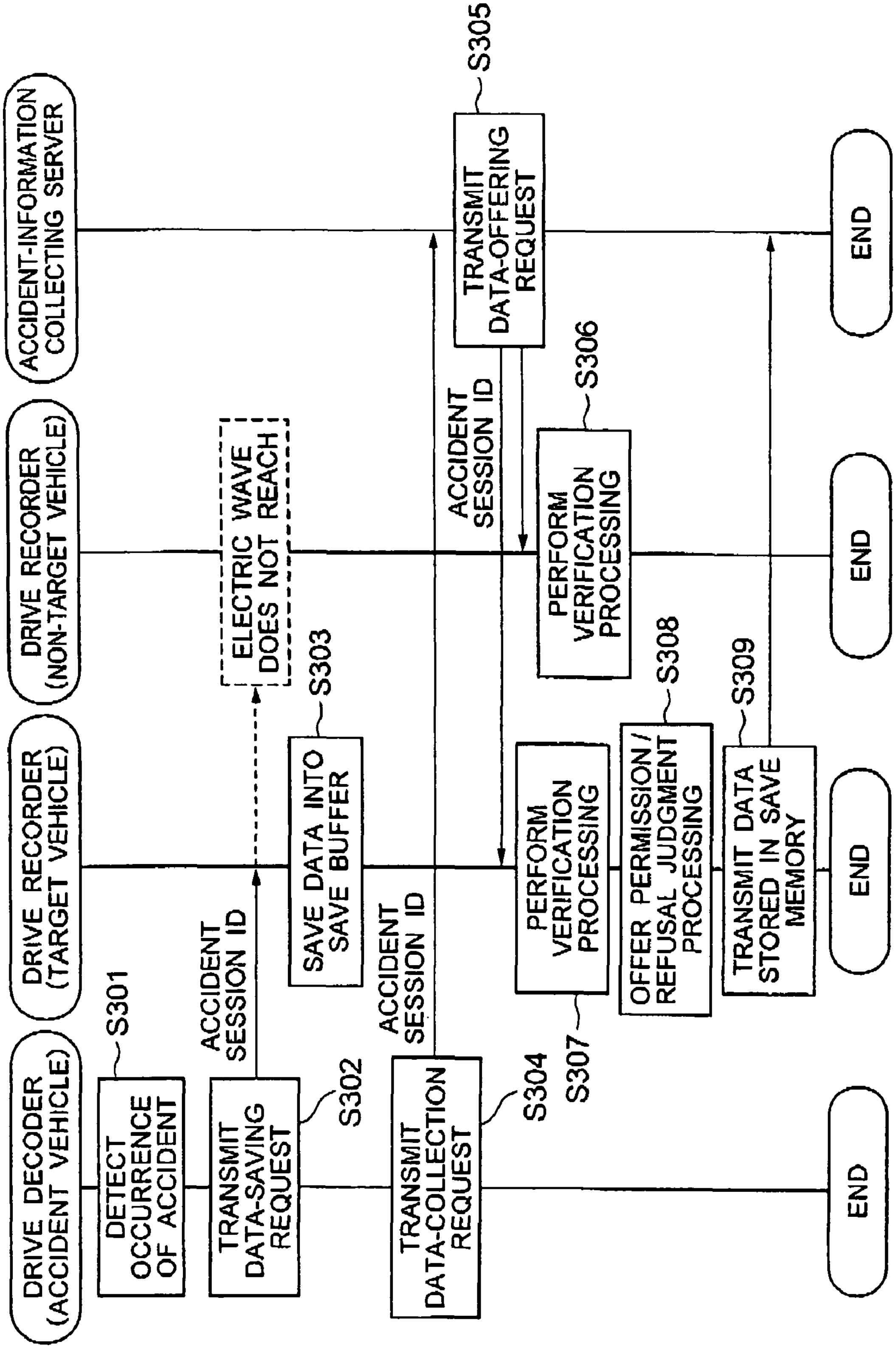
FIG. 10 is a flowchart showing the procedure of recording an image upon occurrence of an accident in the information recording system.

Operation will be described hereinafter. FIG. 10 is a flowchart showing another example of the procedure of recording the image upon occurrence of the accident in the information recording system. In this exemplary embodiment, the procedure of steps S301-S303 is similar to that of steps S101-S103 shown in the first exemplary embodiment. In addition, the procedure of steps S304-S307 is similar to that of steps S204-S207 shown in the second exemplary embodiment.

The image-data offering device 112A, if it judges that the image upon occurrence of the accident can be offered at step S307, instructs the offer permission device 116 to ask the user whether or not the image offering is to be permitted. Then, the offer permission device 116 turns ON the display device 114 configured by an LED, to thereby allow inducement indication of an input as to whether or not the image offering is to be permitted.

The user acknowledges the indication on the display device 114, and depresses the manual operation button of the input device 113 if the user judges that the image offering is to be permitted, to thereby input the instruction that the image offering is permitted. Then, the offer permission device 116 judges that the image offering is permitted by the user based on the fact that the input device 113 has input an instruction of the offer permission (step S308). The offer permission device 116 judges that the image offering has been refused by the user, if the instruction of offer permission is not input until a specific time interval elapses. The offer permission device 116 may store therein specific information specifying permission or refusal of the image offering beforehand, and may judge the permission or refusal of the image offering based on the specific information thus stored.

The image-data offering device 112A instructs the anonymizing device 115 to ask the user whether or not the user name is to be anonymized. Then, the anonymizing device 115 turns ON the display device 114 configured by an LED, to indicate inducement of input as to whether or not the user name is to be anonymized.

The user acknowledges the indication on the display device 114, and depresses the manual operation button of the input device 113 if the user judges anonymizing of the user name, to thereby input the instruction of anonymizing the user name. Then, the anonymizing device 115 judges that anonymizing of the user name is instructed, based on the input of the instruction of anonymizing from the input device 113. The anonymizing device 115 judges that the anonymizing of the user name is not instructed, if the anonymizing instruction is not input until a specific time interval elapses. The anonymizing device 115 may store therein specific information specifying the anonymizing or denial thereof beforehand, and may judge anonymizing or denial thereof based on the specific information thus stored.

The image-data offering device 112A transmits the image, which is extracted from the save memory 107 according to a procedure similar to that of step S208 shown in the second exemplary embodiment, to the accident-information collecting server 20 via the communication network 100 (step S309).

The image-data offering device 112A, upon judging refusal of the image offering at step S308, ends the procedure without performing the processing of step S309. The image-data offering device 112A, upon judging that anonymizing of the user name is instructed, transmits only the image and accident session ID to the accident-information collecting server 20 at step S309, without transmitting the user ID.

As described heretofore, according to this exemplary embodiment, the drive recorder 10A includes the offer permission device 116 that judges permission or refusal of the image offer. Therefore, the user can refuse the image offering, if the user does not wish the own vehicle to be identified by nearby vehicles, for example. In this exemplary embodiment, the drive recorder 10A includes the anonymizing device 115 that anonymizes the user name. Therefore, the user can offer the image with the user name being anonymized, if the user does not wish the own vehicle to be identified by nearby vehicles, for example.

Figure 11:
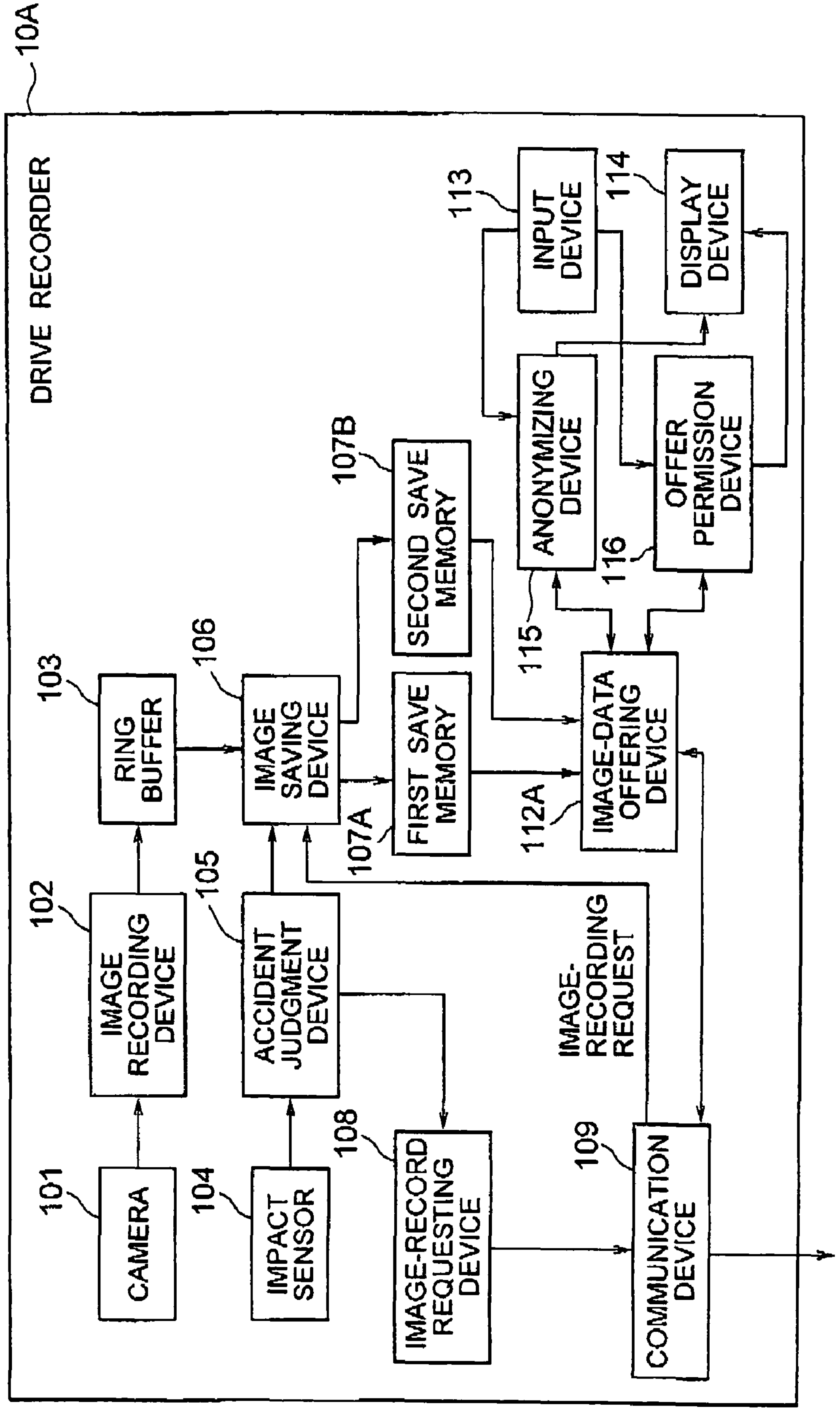
FIG. 11 is a block diagram showing another example of configuration of the drive recorder including two save memories.

The present exemplary embodiment described is such that the drive recorder 10A includes a single save memory 107 for saving the information; however, the drive recorder 10A may include a plurality of save memories. FIG. 11 is a block diagram showing another example of the configuration of a drive recorder including two save memories. In this case, the image saving device 106 saves the image extracted from the ring buffer 103 into a first save memory 107A based on an image-recording request received from another vehicle. Thereafter, the image saving device 106 saves the image extracted from the ring buffer 103 into a second save memory 107B, if the accident judgment device 105 detects occurrence of an accident. Such a configuration allows saving the image of an accident spot of the own vehicle in addition to saving the image of an accident spot of the other vehicle, if the own vehicle causes the accident after saving the image of the accident of the other vehicle.

Fourth Exemplary Embodiment

A fourth exemplary embodiment of the present invention will be described hereinafter. This exemplary embodiment to be described is such that the server on a network collects for accumulation the images upon occurrence of accidents from each vehicle in response to a request from a drive recorder of the accident vehicle, similarly to the second and third exemplary embodiments.

Figure 12:
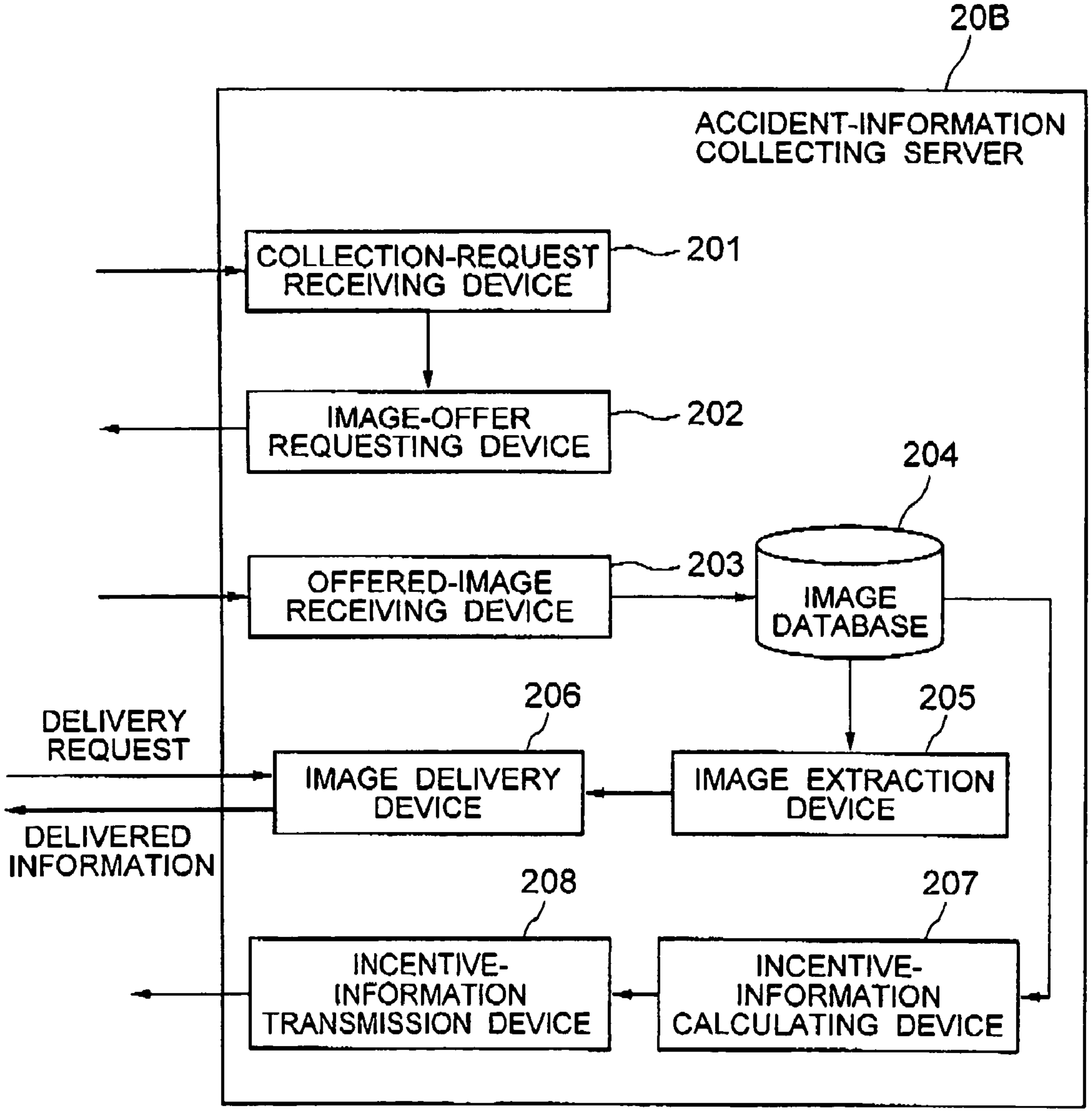
FIG. 12 is a block diagram showing another example of configuration of the accident-information collecting server.

FIG. 12 is a block diagram showing another example of configuration of the accident-information collecting server. This exemplary embodiment is different, as shown in FIG. 12, from the second exemplary embodiment in that the accident-information collecting server 20B includes an incentive-information calculating device 207 and an incentive-information transmission device 208, in addition to the constituent elements of the accident-information collecting server 20 shown in the second exemplary embodiment. In this exemplary embodiment, the function of the drive recorder 10A is similar to the function of the drive recorder 10A shown in the third exemplary embodiment.

The incentive-information calculating device 207 is realized practically by a CPU of the information processor which operates according the program. The incentive-information calculating device 207 has a function of performing a cash back processing to a vehicle user who performed the image offering, based on the fact of image offer upon occurrence of an accident.

In this exemplary embodiment, the incentive-information calculating device 207 calculates for each specific time interval the amount of cash back to the user based on the information accumulated in the image database 204. In this case, the incentive-information calculating device 207 calculates the cash back amount to be paid for the communication fee that costs the user using the drive recorder 10A or car-navigation terminal. The incentive-information calculating device 207 has a function of creating information representing a cash back amount corresponding to the communication fee (referred to as incentive information, hereinafter).

The incentive-information transmission device 208 is realized practically by a CPU and a network interface section of the information processor which operates according the program. The incentive-information transmission device 208 has a function of transmitting the thus created incentive information to a server or terminal managed by a telecom company via the communication network 100. The incentive-information calculating device 207 has a function of transmitting the created incentive information via the communication network 100 to the drive recorder 10A of the vehicle that performed the image offer.

Figure 13:
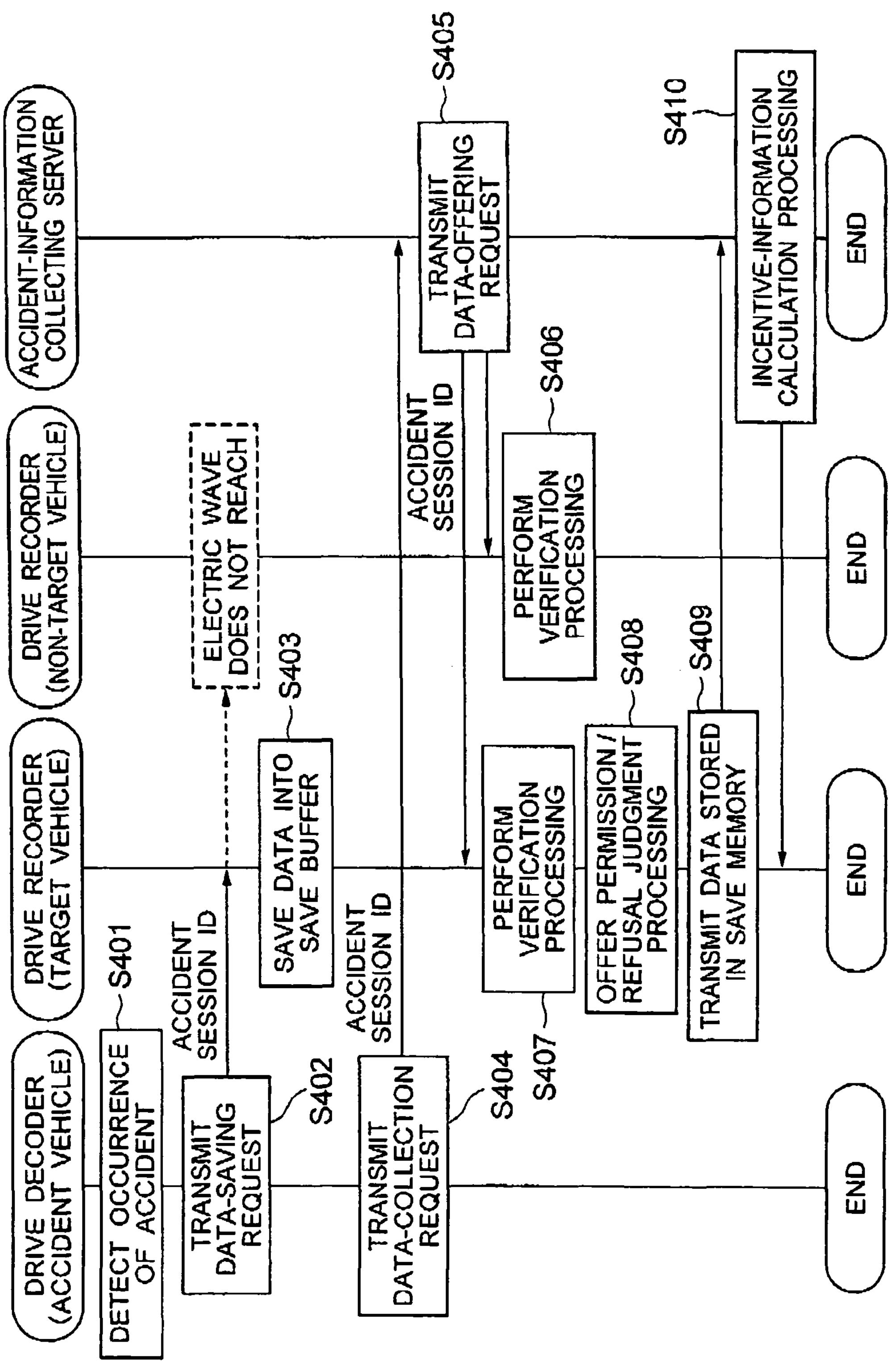
FIG. 13 is a flowchart of another example of the procedure of recording an image in the information recording system upon occurrence of an accident.

Operation will be described hereinafter. FIG. 13 is a flowchart showing another example of the procedure for recording the image upon occurrence of an accident in the information recording system. In this exemplary embodiment, the procedure of steps S401-S409 is similar to that of steps S301-S309 shown in the third exemplary embodiment.

The incentive-information calculating device 207 of the accident-information collecting server 20B creates incentive information for each specified period based on the information accumulated in the image database 204 (step S410). The incentive-information transmission device 208 transmits the incentive information created by the incentive-information calculating device 207, via the communication network 100 to the server or terminal managed by the telecom company. The incentive-information transmission device 208 transmits the incentive information created by the incentive-information calculating device 207 to the drive recorder 10A of a target vehicle via the communication network 100.

As described heretofore, in this exemplary embodiment, the accident-information collecting server 20B creates the incentive information representing the cash back communication fee, and transmits the same to the drive recorder 10A which offered the image. Therefore, the communication cost of the user who offered the image can be reduced, thereby preventing the user of a vehicle other than the accident vehicle from hesitating the image offering due to a burden of the communication cost.

An insurance company or carrier (telecom company), for example, performs the cash back on the communication fee of the communication equipment used for upload of the image. In an alternative, the communication may be made free of charge depending on the number of times for the offering or content of the image, or may be made free for the communication fee of the next month. Such a configuration will allow the user to acknowledge a reduced charge for the insurance or communication so long as the user recognizes the amount of monthly bill, whereby a motivation to the image offering can be raised. Payment of cash back through the insurance company or carrier, if performed, demonstrates the movement between the accounts, and reduces the burden on the payer if there are a plurality of insurance companies involved therein. Burden on the insurance company in this case may be reduced compared to the case where the cash back is paid directly to the user.

The insurance company, which benefits from the offer of the accident image, performs cash back to the carrier, for example, by which the user is billed for installation and operation of the on-vehicle communication module, to thereby reduce the communication cost for the user. If there is an amount of cash back exceeding the monthly payment, the carrier reduces the amount of bill for the next month etc., to thereby reduce the cost on the vehicle for the user. Such a configuration benefits the user to thereby solve the financial problem that may cause the user to hesitate upload of the image. The insurance company can provide a motivation that causes the user to positively offer the image of circumstance evidence, thus collect a large amount of accident information and perform an accurate accident investigation. The amount of cash back may be varied depending on the number of times of upload or content thereof.

Due to collection of a large amount of accident information, the insurance company or user has an advantage in the negotiation of the insurance. In addition, an accurate accident investigation as achieved reduces the cost for the insurance company (such as the cost for arrangement or trail of the accident), thereby reducing the insurance cost charged on the user. The reduction of the insurance cost provides an incentive that causes the user to mount a drive recorder 10 on his vehicle, thereby also providing an expectation of increased sales to the device manufacturer.

Fifth Exemplary Embodiment

A fifth exemplary embodiment of the present invention will be described hereinafter with reference to the drawing. The first through fourth exemplary embodiments described are such that each vehicle transmits and receives a variety of information via a P2P-type communication, such as a vehicle-to-vehicle communication, upon communication between the drive recorders mounted on the vehicles. This exemplary embodiment to be described is such that a variety of information is transmitted/received via a relay station upon communication between the drive recorders.

Figure 14:
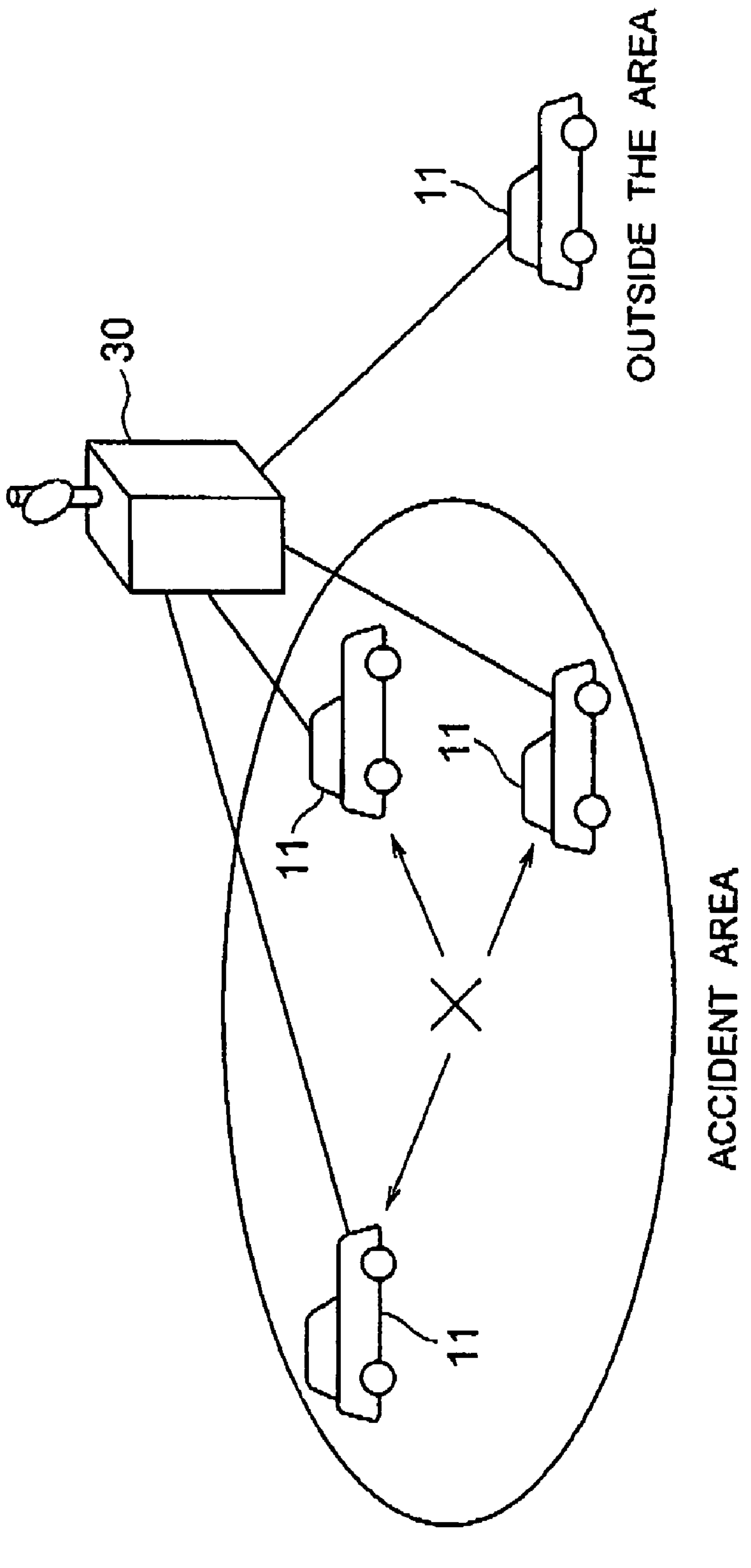
FIG. 14 is an explanatory diagram showing an example of the information recording system in case of communicating via a relay station.

FIG. 14 is an explanatory diagram showing an example of the information recording system in the case of communication via the relay station. In this exemplary embodiment, the information recording system includes a plurality of drive recorders mounted on vehicles 11, similarly to the first through fourth exemplary embodiments. More specifically, the information recording system includes a drive recorder for each of the vehicles. As shown in FIG. 14, the information recording system includes the relay station 30 by which communication between the drive recorders is relayed.

Figure 15:
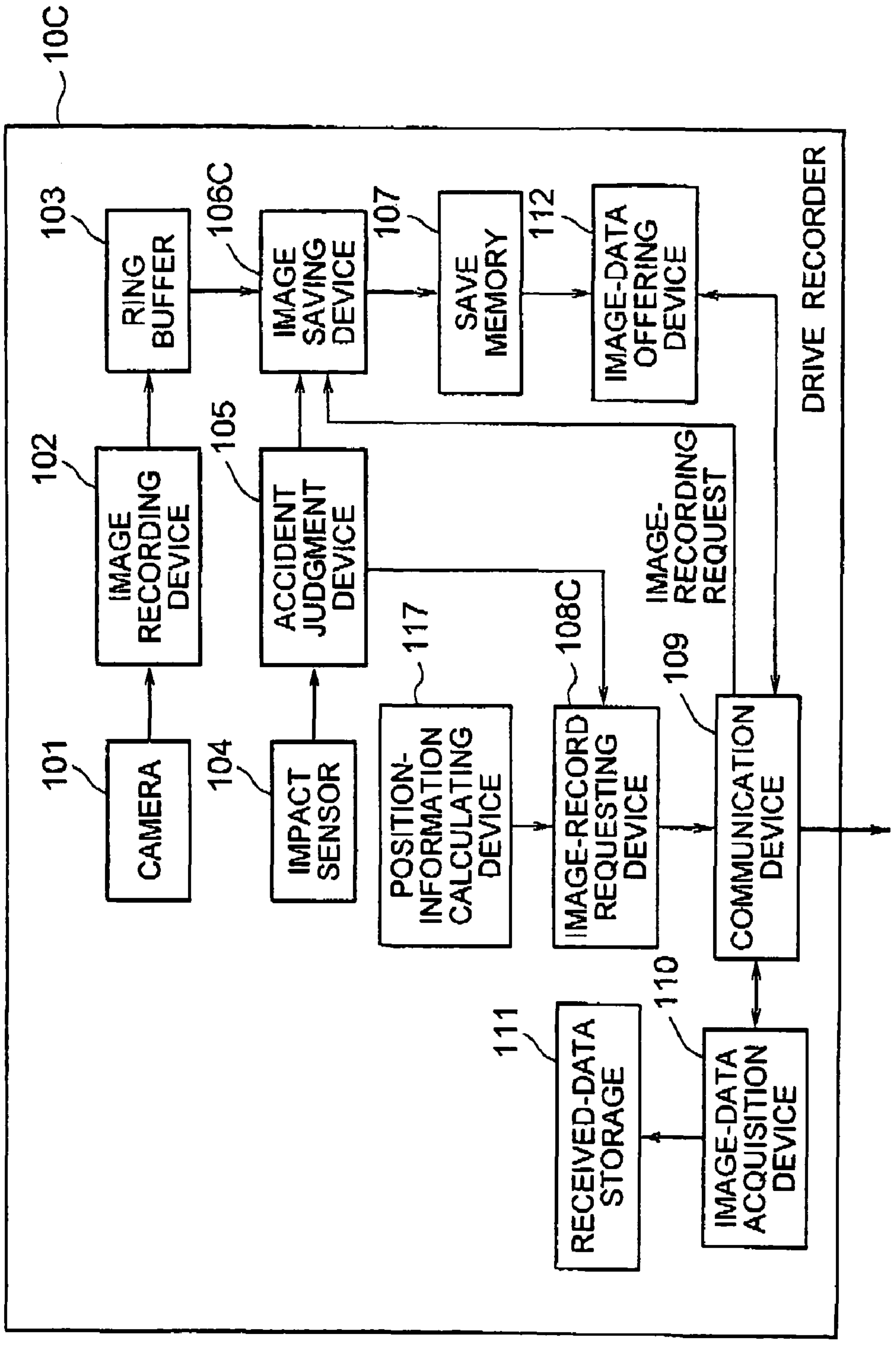
FIG. 15 is a block diagram showing another example of configuration of the drive recorder mounted on a vehicle.

FIG. 15 is a block diagram showing another example of configuration of the drive recorder mounted on a vehicle 11. This exemplary embodiment differs from the first exemplary embodiment in that the drive recorder 10C includes a position-information calculating device 117, as shown in FIG. 15, in addition to the constituent elements of the drive recorder 10 shown in the first embodiment. In this exemplary embodiment, the function of the image saving device 106C and image-record requesting device 108C of the drive recorder 10C differs from the function shown in the first embodiment.

The position-information calculating device 117 is realized practically by the control section of the drive recorder 10C which operates according the program. The position-information calculating device 117 has a function of searching the current position information of the vehicle (namely, position information of the drive recorder 10C upon occurrence of the accident), according to the instruction from the image-record requesting device 108C. In this exemplary embodiment, the drive recorder 10C includes a GPS equipment, and the position-information calculating device 117 obtains the current position information (for example, degrees of latitude and longitude, which may be referred to as accident-spot position information) based on a GPS signal received by the GPS equipment.

The image saving device 106C has a function of extracting the image within several seconds before and after occurrence of the accident among the images stored in the ring buffer 103, according to the instruction of image saving from the accident judgment device 105. In this case, the image saving device 106C extracts an image by a procedure similar to that of the image saving device 106 shown in the first exemplary embodiment.

The image saving device 106C has a function of receiving an image-recording request from the relay station 30 by using the communication device 109. The image saving device 106C has a function of receiving the accident-spot position information from the relay station 30, together with an image-recording request. The image saving device 106C has a function of judging whether or not the own vehicle is running in the vicinity of the accident spot, based on the received accident-spot position information.

The image saving device 106C has a function of extracting, upon judging that the owe vehicle is running in the vicinity of the accident spot, the image within several seconds before and after occurrence of the accident among the images stored in the ring buffer 103, according to the procedure similar to that of the image saving device 106 shown in the first embodiment. The image saving device 106C has a function of storing the extracted image in the save memory 107.

The image-record requesting device 108C has a function of transmitting an image-recording request that requests the image recording to the relay station 30 via using the communication device 109, according to the instruction of the accident judgment device 105. The image-record requesting device 108C has a function of transmitting the accident-spot position information searched by the position-information calculating device 117 to the relay station 30 together with the image-recording request. The image-record requesting device 108C has a function of transmitting the image-offering request that requests offering of the recorded image to the relay station 30 by using the communication device 109.

Figure 16:
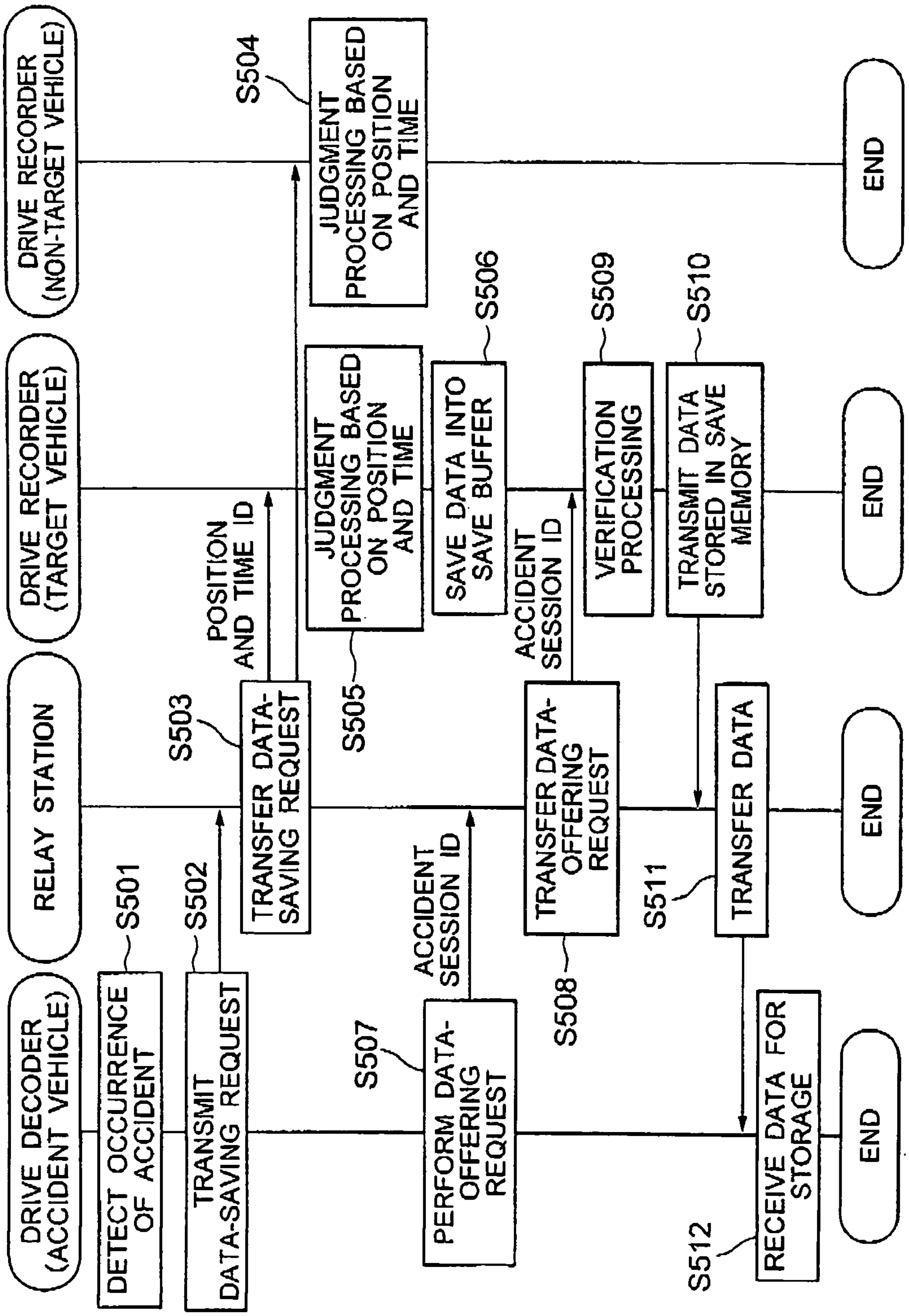
FIG. 16 is flowchart showing another example of the procedure of recording an image in the information recording system upon occurrence of an accident.

Operation will be described hereinafter. FIG. 16 is a flowchart showing an example of the procedure for recording the image upon occurrence of the accident in the information recording system. If an accident, such as collision between vehicles, occurs, the accident judgment device 105 of the drive recorder 10C mounted on the accident vehicle detects occurrence of the accident based on the detection signal of the impact sensor 104 (step S501). Then, the image saving device 106C extracts the image from the ring buffer 103 to save the same into the save memory 107, according to the instruction from the accident judgment device 105.

The image-record requesting device 108C transmits an image-recording request including information of the spot, time, date and ID of the accident to the relay station 30, according to the instruction from the accident judgment device 105 (step S502). In step S502, the image-record requesting device 108C instructs creation of the accident-spot position information to the position-information calculating device 117. Then, the position-information calculating device 117 creates the accident-spot position information, according to the instruction from the image-record requesting device 108C. For example, the position-information calculating device 117 obtains the accident-spot position information based on the GPS signal received by the GPS device.

In step S502, the image-record requesting device 108C creates an accident session ID. The image-record requesting device 108C transmits an image-recording request including the accident-spot position information and accident session ID to the relay station 30. The image-record requesting device 108C may obtain the present time as the accident occurrence time to transmit the same to the relay station 30 together with the image-recording request.

The relay station 30 receives the image-recording request from the drive recorder 10C of the accident vehicle. Then, the relay station 30 transfers (transmits) the received image-recording request to the drive recorder 10C mounted on each vehicle (step S503). In this case, the relay station 30 may transmit the image-recording request including the accident-spot position information and accident session ID to each drive recorder 10C.

The image saving device 106C of the drive recorder 10C mounted on each vehicle receives the image-recording request from the relay station 30. Then, the image saving device 106C judges whether or not the own vehicle is running in the vicinity of the accident spot based on the accident-spot position information included in the image-recording request thus received (step S504, S505).

For example, the image saving device 106C obtains the current position (for example, degrees of latitude and longitude) of the own vehicle based on the GPS signal received by the GPS device receives. The image saving device 106C judges whether or not the current position of the own vehicle thus obtained and the position shown in the received accident-spot position information exist within a specified distance. If the positions exist within the specified distance, the image saving device 106C judges that the own vehicle is running in the vicinity of the accident spot. If the positions do not exist within the specified distance, the image saving device 106C judges that the own vehicle is not running in the vicinity of the accident spot.

The image saving device 106C of the drive recorder 10C mounted on the vehicle, which judges in n step S504 that the own vehicle is not running in the vicinity of the accident spot, ends the procedure without the processing of saving the image.

The image saving device 106C of the drive recorder 10C mounted on the target vehicle judges in step S505 that the own vehicle is running in the vicinity of the accident spot. Therefore, the image saving device 106C extracts an image from the ring buffer 103, to save the same into the save memory 107 (step S506). In this case, the image saving device 106 stores the image in the save memory 107 in association with the accident session ID included in the image-recording request.

As described heretofore, the image upon occurrence of the accident is saved in the drive recorder 10C of the accident vehicle, by performing the procedure of steps S501-S506, and in addition thereto, the image upon occurrence of the accident is saved in the drive recorder 10C of the target vehicle that is running in the vicinity of the accident spot.

The image-record requesting device 108C of the accident vehicle transmits the image-offering request to the relay station 30. The image-record requesting device 108C transmits the image-offering request including the accident session ID as a radio signal (Step 507). The relay station 30 receives the image-offering request from the drive recorder 10C of the accident vehicle. Then, the relay station 30 transfers (transmits) the received image-offering request to the drive recorder 10C of the target vehicle (step S508). In this case, the relay station 30 transmits the image-offering request including the accident session ID to the drive recorder 10C of the target vehicle.

The image-data offering device 112 of the drive recorder 10C of the target vehicle performs a verification processing based on the received image-offering request, according to a processing similar to the processing of step S105 shown in the first embodiment (step S509). The image-data offering device 112, if it judges that the image can be offered to the drive recorder 10C of the accident vehicle, extracts the image from the save memory 107, according to a processing similar to the processing of step S106 shown in the first embodiment. The image-data offering device 112 transmits the extracted image to the relay station 30 (step S510).

The relay station 30 receives the image from the drive recorder 10C of the target vehicle. Then, the relay station 30 transfers (transmits) the received image to the drive recorder 10C of the accident vehicle (step S511).

The image-data acquisition device 110 of the drive recorder 10C on the accident vehicle receives the image as a radio signal from the relay station 30. The image-data acquisition device 110 allows the received-data storage unit 111 to store therein the received image (step S512).

The information recording system may include an accident-information collecting server similarly to the second to fourth exemplary embodiments. In this case, the drive recorder 10C of the accident vehicle transmits an image-collection request to the accident-information collecting server, according to a processing similar to the processing of the second to fourth exemplary embodiments. The accident-information collecting server collects the images from the drive recorder 10C of the target vehicles and accumulates the same, according to a processing similar to the processing of the second to fourth exemplary embodiments.

The drive recorder 10C may include an anonymizing device 115 or offer permission device 116. In this case, the drive recorder 10C performs a processing of anonymizing the user name, or performs a processing of judging permission or refusal of the image offering according to a procedure similar to that in the third and fourth exemplary embodiments.

Figure 17:
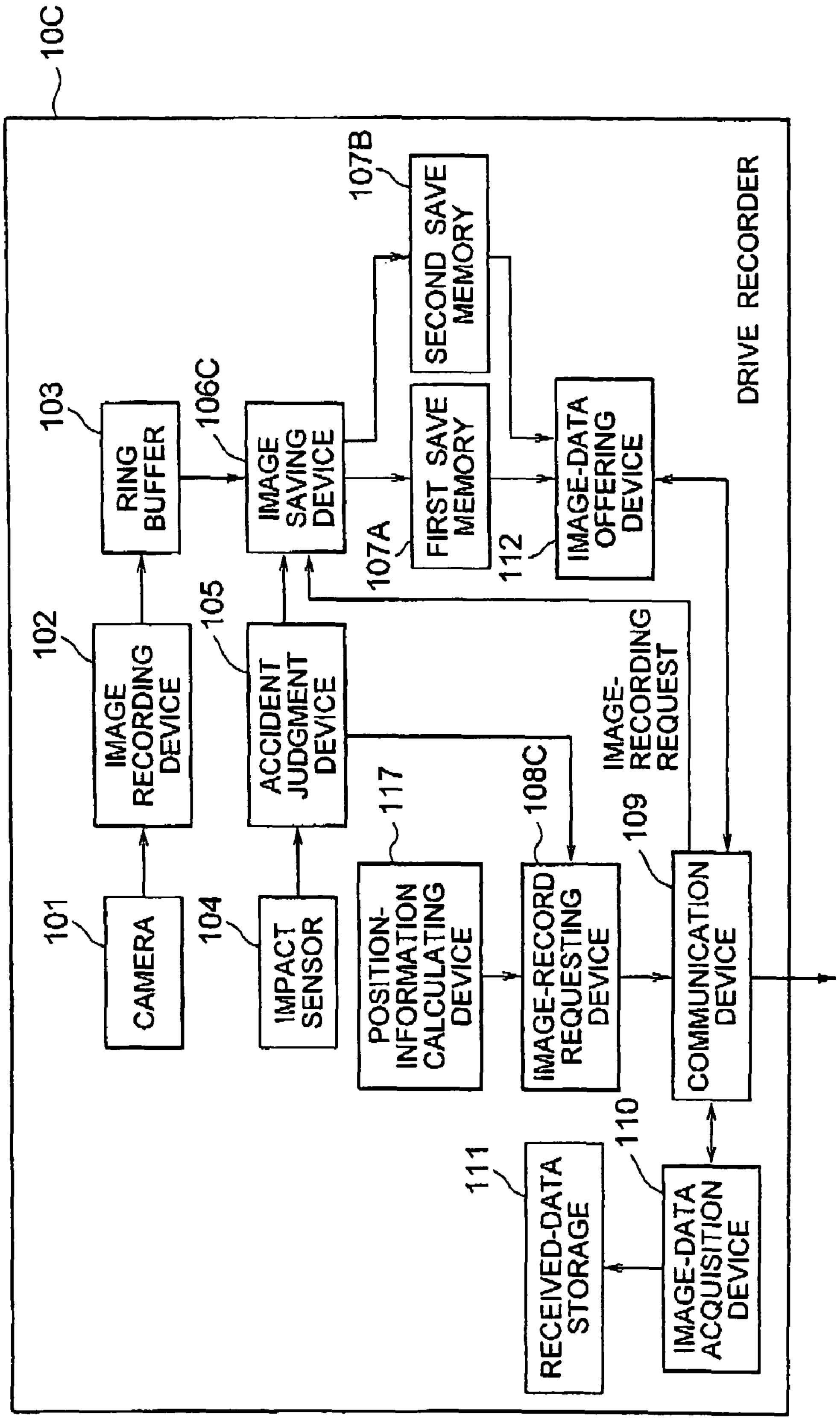
FIG. 17 is a block diagram showing another example of configuration of the drive recorder including two save memories.

This exemplary embodiment described is such that the drive recorder 10C includes a single save memory 107 for saving therein information; however, the drive recorder 10C may include a plurality of save memories. FIG. 17 is a block diagram showing an example of configuration of the drive recorder including two save memories. In this case, the image saving device 106 saves the image extracted from the ring buffer 103 in a first save memory 107A, for example, based on the image-recording request received from the other vehicle. Thereafter, the image saving device 106 saves the image extracted from the ring buffer 103 into a second save memory 107B, if the accident judgment device 105 detects occurrence of an accident. By employing such a configuration, the image of the accident spot of the own vehicle can be saved, in addition to the image of the accident spot of the other vehicle, if the own vehicle causes an accident after storing the image of the accident spot of the other vehicle.

Each of the above embodiments described is such that the information recording device (drive recorder) mounted on a vehicle (for example, car, motorcycle, and train) records the image of the accident spot of the vehicle. However, the information recording device may record the image of an abnormal state, such as break into car, theft of car etc. In this case, the information recording device includes a sensor that detects sound or vibration, for example, and upon detecting the sound of broken glass or vibration of the vehicle, records the image of the abnormal state upon the break into car or theft of car. The information recording device is not limited to an imaging device and may be a device which can record the information as to sound of occurrence or running data of the abnormal circumstance.

Each of the embodiments described above is such that the information recording device is mounted on a vehicle; however, the information recording device may store the image of a stationary camera placed on an electric pole or store, and a monitor camera disposed on a shop street. In this case, the information recording device records the image of abnormal state, such as robbery of store or arson, if sound is detected using a sensor, for example. The information recording device may record the image of a digital camera or a camera-attached portable phone. The information recording device may record an abnormal signal detected by an anticrime terminal. Such a configuration allows the information recording device to record the image as well as a variety of information for an abnormal state, such as a human body obstacle.

In each of the embodiments as described above, the drive recorder may create an encryption key corresponding to the right of access upon occurrence of an accident. The drive recorder creates a public key and a secret key by using a cipher system referred to as public-key crypto system, if the accident judgment device 105 detects occurrence of an accident. In this case, the drive recorder creates an encryption key that permits an access only by the accident-involved person, such as an opponent party of the accident or a driver etc. of the vehicle that was running in the vicinity of the accident. The drive recorder creates an encryption key which permits an access to the image by the insurance company with which the driver of the accident vehicle has a contract. The drive recorder creates an encryption key that permits an access to the image by the organization performing the accident investigation, such as an insurance company. The organizations performing the accident investigation, such as an accident-involved person and the insurance company, may access the image recorded by the drive recorder and the images accumulated in the accident-information collecting server by using the public key obtained.

In the second to fourth embodiments, the accident-information collecting server may specify the vehicle and person that stayed at the accident spot to collect additional information (such as transitional information of the accident), in addition to collecting the images upon occurrence of the accident from the drive recorder of the target vehicle. In this case, the accident-information collecting server, upon receiving an image from the drive recorder of the target vehicle, receives the user ID together with the image. The accident-information collecting server specifies the vehicle which stayed on the accident spot based on the user ID thus received, and requests additional information from the drive recorder of the specified vehicle. The accident-information collecting server delivers the additional information to the server or terminal managed by the organization which performs the accident investigation, such as an insurance company, in addition to the image, in response to a request.

INDUSTRIAL APPLICABILITY

The present invention may be used in an application that records accident information, such as the image of an accident spot of a vehicle by using a drive recorder. The present invention may be used in an application that records the image of an incidence by using a stationary camera placed on an electric pole or shop street.

The invention claimed is:

1. An information collecting server for collecting abnormal-status information representing a status upon occurrence of an abnormal state from information recording devices each including a ring buffer for repeatedly storing therein information and a save memory for storing information separately therefrom, said information collecting server comprising:

an information accumulation device that accumulates information;

a collection-request receiving device that receives collection request information requesting collection of information from any of said information recording devices via a communication network;

an on-server offer requesting device that transmits offer request information requesting offer of information to said information recording devices via the communication network if said collection-request receiving device receives the collection request information; and an information registry device that allows said information accumulation device to store therein the abnormal-status information received from any of said information recording devices.

2. An information recording method for recording abnormal-status information representing a status upon occurrence of an abnormal state, said method comprising:

repeatedly storing, into a ring buffer in a first information recording device, status information representing a status of a vicinity of said first information recording device;

transmitting, from said first information recording device to a second information recording device, save request information requesting save of status information stored in said ring buffer;

extracting in said second information recording device, upon receiving the save request information from said first information recording device, the status information from said ring buffer; and allowing a save memory in said second information recording device that saves information separately from said ring buffer to save the status information extracted from said ring buffer as abnormal-status information.

3. The information recording method according to claim 2, further comprising:

transmitting collection request information requesting collection of information from said first information recording server to an information collecting server via a communication network;

transmitting, upon receiving the collection request information from said first information recording device in said information collecting server, offer request information requesting offer of information from said information collecting server to a second information recording device via the communication network;

extracting, upon receiving the offer request information in said second information recording device from said information collecting server, the abnormal-status information from said save memory in said second information recording device;

transmitting the abnormal-status information extracted from said save memory to said information collecting server via the communication network from said second information recording device; and storing, in a database in said information collecting server, the abnormal-status information received from said second information recording device.

4. An information collecting program for collecting abnormal-status information representing a status upon occurrence of an abnormal state from information recording devices each including a save memory for storing information separately from a ring buffer that repeatedly stores therein information, wherein said program causes a computer including an information accumulation device for accumulating information to execute the processings of:

receiving collection request information requesting to collection of information from any of said information recording devices via a communication network;

transmitting, upon receiving the collection request information, offer request information requesting offer of information to said information recording devices via the communication network; and allowing an information accumulation device to store therein the abnormal-status information received from said information recording devices.

* * * * *